US012730991B2

(12) United States Patent
Newton et al.

(10) Patent No.: US 12,730,991 B2
(45) Date of Patent: Sep. 8, 2026

(54) SYSTEMS AND METHODS FOR DIGITAL ENROLLMENT RESPONSIVE TO SATISFYING PREDETERMINED CONDITIONS

(71) Applicant: Capital One Services, LLC, McLean, VA (US)

(72) Inventors: Lesley Newton, Richmond, VA (US); Daniel Pick, Falls Church, VA (US); Emily Smith, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 264 days.

(21) Appl. No.: 18/133,782

(22) Filed: Apr. 12, 2023

(65) Prior Publication Data

US 2024/0346264 A1 Oct. 17, 2024

(51) Int. Cl.

| | |
|---|---|
| ***G06K 7/08*** | (2006.01) |
| ***G06K 7/10*** | (2006.01) |
| ***G06Q 20/32*** | (2012.01) |
| ***G06Q 20/34*** | (2012.01) |
| ***G06Q 20/40*** | (2012.01) |

(52) U.S. Cl.
CPC ....... *G06K 7/10366* (2013.01); *G06Q 20/322* (2013.01); *G06Q 20/34* (2013.01); *G06Q 20/40* (2013.01)

(58) Field of Classification Search
CPC ............................... G06Q 20/34; G06Q 20/40
USPC .......................................................... 235/379
See application file for complete search history.

(56) References Cited

U.S. PATENT DOCUMENTS

| | | | |
|---|---|---|---|
| 4,683,553 | A | 7/1987 | Mollier |
| 4,827,113 | A | 5/1989 | Rikuna |
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |

(Continued)

FOREIGN PATENT DOCUMENTS

| | | | |
|---|---|---|---|
| CA | 3010336 | A1 | 7/2017 |
| CN | 101192295 | A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Daniel St Cyr
(74) *Attorney, Agent, or Firm* — KDW Firm, PLLC

(57) ABSTRACT

A mobile device can receive a network address from a contactless card, access a web page at the network address, receive a cryptogram from the contactless card, identify a customer account associated with the contactless card, and verify that a phone number of the mobile device is associated with the customer account. When the phone number of the mobile device has been verified as being associated with the customer account, the mobile device can receive user input for accessing the customer account and enroll the contactless card with the mobile application for digitally accessing the customer account via the mobile application.

17 Claims, 16 Drawing Sheets

(56) References Cited

U.S. PATENT DOCUMENTS 5,533,126 A 7/1996 Hazard
5,537,314 A 7/1996 Kanter
5,590,038 A 12/1996 Pitroda
5,592,553 A 1/1997 Guski et al.
5,616,901 A 4/1997 Crandall
5,666,415 A 9/1997 Kaufman
5,763,373 A 6/1998 Robinson et al.
5,764,789 A 6/1998 Pare, Jr. et al.
5,768,373 A 6/1998 Lohstroh et al.
5,778,072 A 7/1998 Samar
5,796,827 A 8/1998 Coppersmith et al.
5,832,090 A 11/1998 Raspotnik
5,883,810 A 3/1999 Franklin et al.
5,901,874 A 5/1999 Deters
5,929,413 A 7/1999 Gardner
5,960,411 A 9/1999 Hartman et al.
6,021,203 A 2/2000 Douceur et al.
6,049,328 A 4/2000 Vanderheiden
6,058,373 A 5/2000 Blinn et al.
6,061,666 A 5/2000 Do et al.
6,105,013 A 8/2000 Curry et al.
6,199,114 B1 3/2001 White et al.
6,199,762 B1 3/2001 Hohle
6,216,227 B1 4/2001 Goldstein et al.
6,227,447 B1 5/2001 Campisano
6,282,522 B1 8/2001 Davis et al.
6,324,271 B1 11/2001 Sawyer et al.
6,342,844 B1 1/2002 Rozin
6,367,011 B1 4/2002 Lee et al.
6,402,028 B1 6/2002 Graham, Jr. et al.
6,438,550 B1 8/2002 Doyle et al.
6,501,847 B2 12/2002 Helot et al.
6,572,015 B1 6/2003 Norton
6,631,197 B1 10/2003 Taenzer
6,641,050 B2 11/2003 Kelley et al.
6,655,585 B2 12/2003 Shinn
6,662,020 B1 12/2003 Aaro et al.
6,721,706 B1 4/2004 Strubbe et al.
6,731,778 B1 5/2004 Oda et al.
6,779,115 B1 8/2004 Naim
6,792,533 B2 9/2004 Jablon
6,829,711 B1 12/2004 Kwok et al.
6,834,271 B1 12/2004 Hodgson et al.
6,834,795 B1 12/2004 Rasmussen et al.
6,852,031 B1 2/2005 Rowe
6,865,547 B1 3/2005 Brake, Jr. et al.
6,873,260 B2 3/2005 Lancos et al.
6,877,656 B1 4/2005 Jaros et al.
6,889,198 B2 5/2005 Kawan
6,905,411 B2 6/2005 Nguyen et al.
6,910,627 B1 6/2005 Simpson-Young et al.
6,971,031 B2 11/2005 Haala
6,990,588 B1 1/2006 Yasukura
7,006,986 B1 2/2006 Sines et al.
7,085,931 B1 8/2006 Smith et al.
7,127,605 B1 10/2006 Montgomery et al.
7,128,274 B2 10/2006 Kelley et al.
7,140,550 B2 11/2006 Ramachandran
7,152,045 B2 12/2006 Hoffman
7,165,727 B2 1/2007 de Jong
7,175,076 B1 2/2007 Block et al.
7,202,773 B1 4/2007 Oba et al.
7,206,806 B2 4/2007 Pineau
7,232,073 B1 6/2007 de Jong
7,246,752 B2 7/2007 Brown
7,252,242 B2 8/2007 Ho
7,254,569 B2 8/2007 Goodman et al.
7,263,507 B1 8/2007 Brake, Jr. et al.
7,270,276 B2 9/2007 Vayssiere
7,278,025 B2 10/2007 Saito et al.
7,287,692 B1 10/2007 Patel et al.
7,290,709 B2 11/2007 Tsai et al.
7,306,143 B2 12/2007 Bonneau, Jr. et al.
7,319,986 B2 1/2008 Praisner et al.
7,325,132 B2 1/2008 Takayama et al.
7,373,515 B2 5/2008 Owen et al.
7,374,099 B2 5/2008 de Jong
7,375,616 B2 5/2008 Rowse et al.
7,380,710 B2 6/2008 Brown
7,424,977 B2 9/2008 Smets et al.
7,453,439 B1 11/2008 Kushler et al.
7,472,829 B2 1/2009 Brown
7,487,357 B2 2/2009 Smith et al.
7,527,208 B2 5/2009 Hammad
7,568,631 B2 8/2009 Gibbs et al.
7,584,153 B2 9/2009 Brown et al.
7,597,250 B2 10/2009 Finn
7,628,322 B2 12/2009 Holtmanns et al.
7,652,578 B2 1/2010 Braun et al.
7,689,832 B2 3/2010 Talmor et al.
7,703,142 B1 4/2010 Wilson et al.
7,748,609 B2 7/2010 Sachdeva et al.
7,748,617 B2 7/2010 Gray
7,748,636 B2 7/2010 Finn
7,762,457 B2 7/2010 Bonalle et al.
7,789,302 B2 9/2010 Tame
7,793,851 B2 9/2010 Mullen
7,796,013 B2 9/2010 Murakami et al.
7,801,799 B1 9/2010 Brake, Jr. et al.
7,801,829 B2 9/2010 Gray et al.
7,805,755 B2 9/2010 Brown et al.
7,809,643 B2 10/2010 Phillips et al.
7,827,115 B2 11/2010 Weller et al.
7,828,214 B2 11/2010 Narendra et al.
7,848,746 B2 12/2010 Juels
7,882,553 B2 2/2011 Tuliani
7,900,048 B2 3/2011 Andersson
7,908,216 B1 3/2011 Davis et al.
7,922,082 B2 4/2011 Muscato
7,933,589 B1 4/2011 Mamdani et al.
7,949,559 B2 5/2011 Freiberg
7,954,716 B2 6/2011 Narendra et al.
7,954,723 B2 6/2011 Charrat
7,962,369 B2 6/2011 Rosenberg
7,993,197 B2 8/2011 Kaminkow
8,005,426 B2 8/2011 Huomo et al.
8,010,405 B1 8/2011 Bortolin et al.
RE42,762 E 9/2011 Shin et al.
8,041,954 B2 10/2011 Plesman
8,060,012 B2 11/2011 Sklovsky et al.
8,074,877 B2 12/2011 Mullen et al.
8,082,450 B2 12/2011 Frey et al.
8,095,113 B2 1/2012 Kean et al.
8,099,332 B2 1/2012 Lemay et al.
8,103,249 B2 1/2012 Markison
8,108,687 B2 1/2012 Ellis et al.
8,127,143 B2 2/2012 Abdallah et al.
8,135,648 B2 3/2012 Oram et al.
8,140,010 B2 3/2012 Symons et al.
8,141,136 B2 3/2012 Lee et al.
8,150,321 B2 4/2012 Winter et al.
8,150,767 B2 4/2012 Wankmueller
8,186,602 B2 5/2012 Itay et al.
8,196,131 B1 6/2012 von Behren et al.
8,215,563 B2 7/2012 Levy et al.
8,224,753 B2 7/2012 Atef et al.
8,232,879 B2 7/2012 Davis
8,233,841 B2 7/2012 Griffin et al.
8,245,292 B2 8/2012 Buer
8,249,654 B1 8/2012 Zhu
8,266,451 B2 9/2012 Leydier et al.
8,276,814 B1 10/2012 Davis
8,285,329 B1 10/2012 Zhu
8,302,872 B2 11/2012 Mullen
8,312,519 B1 11/2012 Bailey et al.
8,316,237 B1 11/2012 Felsher et al.
8,332,272 B2 12/2012 Fisher
8,346,670 B2 1/2013 Hasson
8,365,988 B1 2/2013 Medina, III et al.
8,369,960 B2 2/2013 Tran et al.
8,371,501 B1 2/2013 Hopkins
8,381,307 B2 2/2013 Cimino
8,391,719 B2 3/2013 Alameh et al.
8,417,231 B2 4/2013 Sanding et al.

(56) References Cited

U.S. PATENT DOCUMENTS 8,439,271 B2 5/2013 Smets et al.
8,475,367 B1 7/2013 Yuen et al.
8,489,112 B2 7/2013 Roeding et al.
8,511,542 B2 8/2013 Pan
8,511,547 B2 8/2013 Rans
8,519,822 B2 8/2013 Riegebauer
8,559,872 B2 10/2013 Butler
8,566,916 B1 10/2013 Bailey et al.
8,567,670 B2 10/2013 Stanfield et al.
8,572,386 B2 10/2013 Takekawa et al.
8,577,810 B1 11/2013 Dalit et al.
8,583,454 B2 11/2013 Beraja et al.
8,589,335 B2 11/2013 Smith et al.
8,594,730 B2 11/2013 Bona et al.
8,615,468 B2 12/2013 Varadarajan
8,620,218 B2 12/2013 Awad
8,667,285 B2 3/2014 Coulier et al.
8,723,941 B1 5/2014 Shirbabadi et al.
8,726,405 B1 5/2014 Bailey et al.
8,740,073 B2 6/2014 Vijayshankar et al.
8,750,514 B2 6/2014 Gallo et al.
8,752,189 B2 6/2014 de Jong
8,794,509 B2 8/2014 Bishop et al.
8,799,668 B2 8/2014 Cheng
8,806,592 B2 8/2014 Ganesan
8,807,440 B1 8/2014 von Behren et al.
8,811,892 B2 8/2014 Khan et al.
8,814,039 B2 8/2014 Bishop et al.
8,814,052 B2 8/2014 Bona et al.
8,818,867 B2 8/2014 Baldwin et al.
8,850,538 B1 9/2014 Vernon et al.
8,861,733 B2 10/2014 Benteo et al.
8,870,081 B2 10/2014 Olson
8,880,027 B1 11/2014 Darringer
8,888,002 B2 11/2014 Marshall Chesney et al.
8,898,088 B2 11/2014 Springer et al.
8,934,837 B2 1/2015 Zhu et al.
8,977,569 B2 3/2015 Rao
8,994,498 B2 3/2015 Agrafioti et al.
9,004,365 B2 4/2015 Bona et al.
9,038,893 B2 5/2015 Kirkham
9,038,894 B2 5/2015 Khalid
9,042,814 B2 5/2015 Royston et al.
9,047,531 B2 6/2015 Showering et al.
9,069,976 B2 6/2015 Toole et al.
9,081,948 B2 7/2015 Magne
9,104,853 B2 8/2015 Venkataramani et al.
9,118,663 B1 8/2015 Bailey et al.
9,122,964 B2 9/2015 Krawczewicz
9,129,199 B2 9/2015 Spodak
9,129,280 B2 9/2015 Bona et al.
9,152,832 B2 10/2015 Royston et al.
9,183,490 B2 11/2015 Moreton
9,203,800 B2 12/2015 Izu et al.
9,209,867 B2 12/2015 Royston
9,251,330 B2 2/2016 Boivie et al.
9,251,518 B2 2/2016 Levin et al.
9,258,715 B2 2/2016 Borghei
9,270,337 B2 2/2016 Zhu et al.
9,275,325 B2 3/2016 Newcombe
9,286,606 B2 3/2016 Diamond
9,306,626 B2 4/2016 Hall et al.
9,306,753 B1 4/2016 Vandervort
9,306,942 B1 4/2016 Bailey et al.
9,324,066 B2 4/2016 Archer et al.
9,324,067 B2 4/2016 Van Os et al.
9,332,587 B2 5/2016 Salahshoor
9,338,622 B2 5/2016 Bjontegard
9,373,141 B1 6/2016 Shakkarwar
9,379,841 B2 6/2016 Fine et al.
9,413,430 B2 8/2016 Royston et al.
9,413,768 B1 8/2016 Gregg et al.
9,420,496 B1 8/2016 Indurkar
9,426,132 B1 8/2016 Alikhani
9,432,339 B1 8/2016 Bowness
9,455,968 B1 9/2016 Machani et al.
9,473,509 B2 10/2016 Arsanjani et al.
9,491,626 B2 11/2016 Sharma et al.
9,501,776 B2 11/2016 Martin
9,553,637 B2 1/2017 Yang et al.
9,619,952 B1 4/2017 Zhao et al.
9,635,000 B1 4/2017 Muftic
9,665,858 B1 5/2017 Kumar
9,674,705 B2 6/2017 Rose et al.
9,679,286 B2 6/2017 Colnot et al.
9,680,942 B2 6/2017 Dimmick
9,710,744 B2 7/2017 Wurmfeld
9,710,804 B2 7/2017 Zhou et al.
9,740,342 B2 8/2017 Paulsen et al.
9,740,988 B1 8/2017 Levin et al.
9,763,097 B2 9/2017 Robinson et al.
9,767,329 B2 9/2017 Forster
9,769,662 B1 9/2017 Queru
9,773,151 B2 9/2017 Mil'shtein et al.
9,780,953 B2 10/2017 Gaddam et al.
9,891,823 B2 2/2018 Feng et al.
9,940,571 B1 4/2018 Herrington
9,949,065 B1 4/2018 Zarakas
9,953,323 B2 4/2018 Candelore et al.
9,961,194 B1 5/2018 Wiechman et al.
9,965,632 B2 5/2018 Zarakas
9,965,756 B2 5/2018 Davis et al.
9,965,911 B2 5/2018 Wishne
9,977,890 B2 5/2018 Alberti
9,978,056 B2 5/2018 Seo
9,978,058 B2 5/2018 Wurmfeld et al.
9,990,795 B2 6/2018 Wurmfeld
10,007,873 B2 6/2018 Heo
10,013,693 B2 7/2018 Wyatt
10,043,164 B2 8/2018 Dogin et al.
10,075,437 B1 9/2018 Costigan et al.
10,121,130 B2 11/2018 Pinski
10,129,648 B1 11/2018 Hernandez et al.
10,133,979 B1 11/2018 Eidam et al.
10,210,505 B2 2/2019 Zarakas
10,217,105 B1 2/2019 Sangi et al.
10,242,368 B1 3/2019 Poole
10,296,910 B1 5/2019 Templeton
10,332,102 B2 6/2019 Zarakas
10,360,557 B2 7/2019 Locke
10,380,471 B2 8/2019 Locke
10,395,244 B1 8/2019 Mossler
10,453,054 B2 10/2019 Zarakas
10,474,941 B2 11/2019 Wurmfeld
10,475,027 B2 11/2019 Guise
10,482,453 B2 11/2019 Zarakas
10,482,457 B2 11/2019 Poole
10,489,774 B2 11/2019 Zarakas
10,489,781 B1 11/2019 Osborn
10,510,070 B2 12/2019 Wurmfeld
10,515,361 B2 12/2019 Zarakas
10,535,068 B2 1/2020 Locke
10,546,444 B2 1/2020 Osborn
10,581,611 B1 3/2020 Osborn
10,664,830 B1 5/2020 Rule
10,685,349 B2 6/2020 Brickell
10,797,882 B2 10/2020 Rule
10,880,741 B2 12/2020 Zarakas
10,909,525 B1 2/2021 Dhodapkar
10,970,691 B2 4/2021 Koeppel
10,984,416 B2 4/2021 Ilincic
11,037,136 B2 6/2021 Rule
11,062,098 B1 7/2021 Bergeron
11,120,453 B2 9/2021 Rule
11,138,593 B1 10/2021 Ho
11,138,605 B2 10/2021 Aabye
11,176,540 B2 11/2021 Gupta
11,188,908 B2 11/2021 Locke
11,216,806 B2 1/2022 Mossler
11,295,297 B1 * 4/2022 Kushner ............ G06Q 20/3224
11,297,958 B2 4/2022 Vukich
11,334,872 B2 5/2022 Phillips
11,361,173 B2 6/2022 Edwards
11,392,933 B2 7/2022 Mossler

(56) References Cited

U.S. PATENT DOCUMENTS

| | | | |
|---|---|---|---|
| 11,392,935 | B2 | 7/2022 | Suresh |
| 11,416,844 | B1 | 8/2022 | Osterkamp |
| 11,423,392 | B1 | 8/2022 | Ho |
| 11,443,292 | B2 | 9/2022 | Sherif |
| 11,444,770 | B2 | 9/2022 | Wieker |
| 11,461,764 | B2 | 10/2022 | Rule |
| 11,481,764 | B2 | 10/2022 | Shakkarwar |
| 11,521,213 | B2 | 12/2022 | Rule |
| 11,551,200 | B1 | 1/2023 | Cook |
| 11,556,918 | B2 | 1/2023 | Mestre |
| 11,615,395 | B2 | 3/2023 | McHugh |
| 11,777,933 | B2 | 10/2023 | Moreton |
| 2001/0010723 | A1 | 8/2001 | Pinkas |
| 2001/0029485 | A1 | 10/2001 | Brody et al. |
| 2001/0034702 | A1 | 10/2001 | Mockett et al. |
| 2001/0054003 | A1 | 12/2001 | Chien et al. |
| 2002/0078345 | A1 | 6/2002 | Sandhu et al. |
| 2002/0093530 | A1 | 7/2002 | Krothapalli et al. |
| 2002/0100808 | A1 | 8/2002 | Norwood et al. |
| 2002/0120583 | A1 | 8/2002 | Keresman, III et al. |
| 2002/0152116 | A1 | 10/2002 | Yan et al. |
| 2002/0153424 | A1 | 10/2002 | Li |
| 2002/0165827 | A1 | 11/2002 | Gien et al. |
| 2003/0023554 | A1 | 1/2003 | Yap et al. |
| 2003/0034873 | A1 | 2/2003 | Chase et al. |
| 2003/0055727 | A1 | 3/2003 | Walker et al. |
| 2003/0078882 | A1 | 4/2003 | Sukeda et al. |
| 2003/0167350 | A1 | 9/2003 | Davis et al. |
| 2003/0208449 | A1 | 11/2003 | Diao |
| 2003/0220876 | A1 | 11/2003 | Burger |
| 2004/0015958 | A1 | 1/2004 | Veil et al. |
| 2004/0039919 | A1 | 2/2004 | Takayama et al. |
| 2004/0127256 | A1 | 7/2004 | Goldthwaite et al. |
| 2004/0215674 | A1 | 10/2004 | Odinak et al. |
| 2004/0230799 | A1 | 11/2004 | Davis |
| 2005/0044367 | A1 | 2/2005 | Gasparini et al. |
| 2005/0075985 | A1 | 4/2005 | Cartmell |
| 2005/0081038 | A1 | 4/2005 | Arditti Modiano et al. |
| 2005/0138387 | A1 | 6/2005 | Lam et al. |
| 2005/0156026 | A1 | 7/2005 | Ghosh et al. |
| 2005/0160049 | A1 | 7/2005 | Lundholm |
| 2005/0195975 | A1 | 9/2005 | Kawakita |
| 2005/0228997 | A1 | 10/2005 | Bicker |
| 2005/0247797 | A1 | 11/2005 | Ramachandran |
| 2005/0269402 | A1 | 12/2005 | Spitzer |
| 2006/0006230 | A1 | 1/2006 | Bear et al. |
| 2006/0040726 | A1 | 2/2006 | Szrek et al. |
| 2006/0041402 | A1 | 2/2006 | Baker |
| 2006/0044153 | A1 | 3/2006 | Dawidowsky |
| 2006/0047954 | A1 | 3/2006 | Sachdeva et al. |
| 2006/0085848 | A1 | 4/2006 | Aissi et al. |
| 2006/0136334 | A1 | 6/2006 | Atkinson et al. |
| 2006/0173985 | A1 | 8/2006 | Moore |
| 2006/0174331 | A1 | 8/2006 | Schuetz |
| 2006/0242698 | A1 | 10/2006 | Inskeep et al. |
| 2006/0280338 | A1 | 12/2006 | Rabb |
| 2007/0033642 | A1 | 2/2007 | Ganesan et al. |
| 2007/0055630 | A1 | 3/2007 | Gauthier et al. |
| 2007/0061266 | A1 | 3/2007 | Moore et al. |
| 2007/0061487 | A1 | 3/2007 | Moore et al. |
| 2007/0116292 | A1 | 5/2007 | Kurita et al. |
| 2007/0118745 | A1 | 5/2007 | Buer |
| 2007/0197261 | A1 | 8/2007 | Humbel |
| 2007/0224969 | A1 | 9/2007 | Rao |
| 2007/0241182 | A1 | 10/2007 | Buer |
| 2007/0256134 | A1 | 11/2007 | Lehtonen et al. |
| 2007/0258594 | A1 | 11/2007 | Sandhu et al. |
| 2007/0276765 | A1 | 11/2007 | Hazel |
| 2007/0278291 | A1 | 12/2007 | Rans et al. |
| 2008/0008315 | A1 | 1/2008 | Fontana et al. |
| 2008/0011831 | A1 | 1/2008 | Bonalle et al. |
| 2008/0014867 | A1 | 1/2008 | Finn |
| 2008/0035738 | A1 | 2/2008 | Mullen |
| 2008/0071681 | A1 | 3/2008 | Khalid |
| 2008/0072303 | A1 | 3/2008 | Syed |
| 2008/0082452 | A1 | 4/2008 | Wankmueller |
| 2008/0086767 | A1 | 4/2008 | Kulkarni et al. |
| 2008/0099552 | A1 | 5/2008 | Grillion |
| 2008/0103968 | A1 | 5/2008 | Bies et al. |
| 2008/0109309 | A1 | 5/2008 | Andau et al. |
| 2008/0110983 | A1 | 5/2008 | Ashfield |
| 2008/0120711 | A1 | 5/2008 | Dispensa |
| 2008/0156873 | A1 | 7/2008 | Wilhelm et al. |
| 2008/0162312 | A1 | 7/2008 | Sklovsky et al. |
| 2008/0164308 | A1 | 7/2008 | Aaron et al. |
| 2008/0207307 | A1 | 8/2008 | Cunningham Ii et al. |
| 2008/0209543 | A1 | 8/2008 | Aaron |
| 2008/0223918 | A1 | 9/2008 | Williams et al. |
| 2008/0285746 | A1 | 11/2008 | Androck et al. |
| 2008/0308641 | A1 | 12/2008 | Finn |
| 2009/0037275 | A1 | 2/2009 | Pollio |
| 2009/0048026 | A1 | 2/2009 | French |
| 2009/0132417 | A1 | 5/2009 | Scipioni et al. |
| 2009/0143104 | A1 | 6/2009 | Loh et al. |
| 2009/0171682 | A1 | 7/2009 | Dixon et al. |
| 2009/0210308 | A1 | 8/2009 | Toomer et al. |
| 2009/0235339 | A1 | 9/2009 | Mennes et al. |
| 2009/0249077 | A1 | 10/2009 | Gargaro et al. |
| 2009/0282264 | A1 | 11/2009 | Ameil et al. |
| 2010/0023449 | A1 | 1/2010 | Skowronek et al. |
| 2010/0023455 | A1 | 1/2010 | Dispensa et al. |
| 2010/0029202 | A1 | 2/2010 | Jolivet et al. |
| 2010/0033310 | A1 | 2/2010 | Narendra et al. |
| 2010/0036769 | A1 | 2/2010 | Winters et al. |
| 2010/0078471 | A1 | 4/2010 | Lin et al. |
| 2010/0082491 | A1 | 4/2010 | Rosenblatt et al. |
| 2010/0094754 | A1 | 4/2010 | Bertran et al. |
| 2010/0095130 | A1 | 4/2010 | Bertran et al. |
| 2010/0100480 | A1 | 4/2010 | Altman et al. |
| 2010/0114731 | A1 | 5/2010 | Kingston et al. |
| 2010/0192230 | A1 | 7/2010 | Steeves et al. |
| 2010/0207742 | A1 | 8/2010 | Buhot et al. |
| 2010/0211797 | A1 | 8/2010 | Westerveld et al. |
| 2010/0240413 | A1 | 9/2010 | He et al. |
| 2010/0257357 | A1 | 10/2010 | McClain |
| 2010/0312634 | A1 | 12/2010 | Cervenka |
| 2010/0312635 | A1 | 12/2010 | Cervenka |
| 2011/0028160 | A1 | 2/2011 | Roeding et al. |
| 2011/0035604 | A1 | 2/2011 | Habraken |
| 2011/0060631 | A1 | 3/2011 | Grossman et al. |
| 2011/0068170 | A1 | 3/2011 | Lehman |
| 2011/0084132 | A1 | 4/2011 | Tofighbakhsh |
| 2011/0101093 | A1 | 5/2011 | Ehrensvard |
| 2011/0113245 | A1 | 5/2011 | Varadarajan |
| 2011/0125638 | A1 | 5/2011 | Davis et al. |
| 2011/0131415 | A1 | 6/2011 | Schneider |
| 2011/0153437 | A1 | 6/2011 | Archer et al. |
| 2011/0153496 | A1 | 6/2011 | Royyuru |
| 2011/0155801 | A1 | 6/2011 | Rowberry |
| 2011/0208658 | A1 | 8/2011 | Makhotin |
| 2011/0208965 | A1 | 8/2011 | Machani |
| 2011/0211219 | A1 | 9/2011 | Bradley et al. |
| 2011/0218911 | A1 | 9/2011 | Spodak |
| 2011/0238564 | A1 | 9/2011 | Lim et al. |
| 2011/0246780 | A1 | 10/2011 | Yeap et al. |
| 2011/0258452 | A1 | 10/2011 | Coulier et al. |
| 2011/0280406 | A1 | 11/2011 | Ma et al. |
| 2011/0282785 | A1 | 11/2011 | Chin |
| 2011/0294418 | A1 | 12/2011 | Chen |
| 2011/0312271 | A1 | 12/2011 | Ma et al. |
| 2012/0024947 | A1 | 2/2012 | Naelon |
| 2012/0030047 | A1 | 2/2012 | Fuentes et al. |
| 2012/0030121 | A1 | 2/2012 | Grellier |
| 2012/0047071 | A1 | 2/2012 | Mullen et al. |
| 2012/0079281 | A1 | 3/2012 | Lowenstein et al. |
| 2012/0109735 | A1 | 5/2012 | Krawczewicz et al. |
| 2012/0109764 | A1 | 5/2012 | Martin et al. |
| 2012/0143703 | A1 | 6/2012 | Wall |
| 2012/0143754 | A1 | 6/2012 | Patel |
| 2012/0150737 | A1 | 6/2012 | Rottink et al. |
| 2012/0178366 | A1 | 7/2012 | Levy et al. |
| 2012/0196583 | A1 | 8/2012 | Kindo |
| 2012/0207305 | A1 | 8/2012 | Gallo et al. |
| 2012/0209773 | A1 | 8/2012 | Ranganathan |

(56) References Cited

U.S. PATENT DOCUMENTS

2012/0238206 A1 9/2012 Singh et al.
2012/0239560 A1 9/2012 Pourfallah et al.
2012/0252350 A1 10/2012 Steinmetz et al.
2012/0254394 A1 10/2012 Barras
2012/0284194 A1 11/2012 Liu et al.
2012/0290472 A1 11/2012 Mullen et al.
2012/0296818 A1 11/2012 Nuzzi et al.
2012/0316992 A1 12/2012 Oborne
2012/0317035 A1 12/2012 Royyuru et al.
2012/0317628 A1 12/2012 Yeager
2013/0005245 A1 1/2013 Royston
2013/0008956 A1 1/2013 Ashfield
2013/0026229 A1 1/2013 Jarman et al.
2013/0030997 A1 1/2013 Spodak
2013/0048713 A1 2/2013 Pan
2013/0054474 A1 2/2013 Yeager
2013/0065564 A1 3/2013 Conner et al.
2013/0080228 A1 3/2013 Fisher
2013/0080229 A1 3/2013 Fisher
2013/0099587 A1 4/2013 Lou et al.
2013/0104251 A1 4/2013 Moore et al.
2013/0106576 A1 5/2013 Hinman et al.
2013/0119130 A1 5/2013 Braams
2013/0130614 A1 5/2013 Busch-Sorensen
2013/0144793 A1 6/2013 Royston
2013/0146657 A1 6/2013 Graef
2013/0171929 A1 7/2013 Adams et al.
2013/0179351 A1 7/2013 Wallner
2013/0185772 A1 7/2013 Jaudon et al.
2013/0191279 A1 7/2013 Calman et al.
2013/0200999 A1 8/2013 Spodak et al.
2013/0211937 A1 8/2013 Elbirt
2013/0216108 A1 8/2013 Hwang et al.
2013/0226791 A1 8/2013 Springer et al.
2013/0226796 A1 8/2013 Jiang et al.
2013/0232082 A1 9/2013 Krawczewicz et al.
2013/0238894 A1 9/2013 Ferg et al.
2013/0282360 A1 10/2013 Shimota et al.
2013/0303085 A1 11/2013 Boucher et al.
2013/0304651 A1 11/2013 Smith
2013/0311363 A1 11/2013 Ramaci
2013/0312082 A1 11/2013 Izu et al.
2013/0314593 A1 11/2013 Reznik et al.
2013/0344857 A1 12/2013 Berionne et al.
2014/0002238 A1 1/2014 Taveau et al.
2014/0019352 A1 1/2014 Shrivastava
2014/0027506 A1 1/2014 Heo et al.
2014/0032409 A1 1/2014 Rosano
2014/0032410 A1 1/2014 Georgiev et al.
2014/0040120 A1 2/2014 Cho et al.
2014/0040139 A1 2/2014 Brudnicki et al.
2014/0040147 A1 2/2014 Varadarakan et al.
2014/0047235 A1 2/2014 Lessiak et al.
2014/0067690 A1 3/2014 Pitroda et al.
2014/0074637 A1 3/2014 Hammad
2014/0074655 A1 3/2014 Lim et al.
2014/0081720 A1 3/2014 Wu
2014/0081785 A1 3/2014 Valadas Preto
2014/0138435 A1 5/2014 Khalid
2014/0171034 A1 6/2014 Aleksin et al.
2014/0171039 A1 6/2014 Bjontegard
2014/0172700 A1 6/2014 Teuwen et al.
2014/0180851 A1 6/2014 Fisher
2014/0208112 A1 7/2014 McDonald et al.
2014/0214674 A1 7/2014 Narula
2014/0229375 A1 8/2014 Zaytzsev et al.
2014/0245391 A1 8/2014 Adenuga
2014/0256251 A1 9/2014 Caceres et al.
2014/0258099 A1 9/2014 Rosano
2014/0258113 A1 9/2014 Gauthier et al.
2014/0258125 A1 9/2014 Gerber et al.
2014/0274179 A1 9/2014 Zhu et al.
2014/0279479 A1 9/2014 Maniar et al.
2014/0337235 A1 11/2014 Van Heerden et al.
2014/0339315 A1 11/2014 Ko
2014/0346860 A1 11/2014 Aubry et al.
2014/0365377 A1 12/2014 Salama
2014/0365780 A1 12/2014 Movassaghi
2014/0379361 A1 12/2014 Mahadkar et al.
2015/0012444 A1 1/2015 Brown et al.
2015/0032635 A1 1/2015 Guise
2015/0071486 A1 3/2015 Rhoads et al.
2015/0073983 A1 3/2015 Bartenstein
2015/0088757 A1 3/2015 Zhou et al.
2015/0089586 A1 3/2015 Ballesteros
2015/0113271 A1 4/2015 Jooste
2015/0134452 A1 5/2015 Williams
2015/0134513 A1 5/2015 Olson
2015/0140960 A1 5/2015 Powell et al.
2015/0154595 A1 6/2015 Collinge et al.
2015/0170138 A1 6/2015 Rao
2015/0178724 A1 6/2015 Ngo et al.
2015/0186871 A1 7/2015 Laracey
2015/0199673 A1 7/2015 Savolainen
2015/0199863 A1 7/2015 Scoggins
2015/0205379 A1 7/2015 Mag et al.
2015/0254637 A1 9/2015 Yang
2015/0302409 A1 10/2015 Malek et al.
2015/0317295 A1 11/2015 Sherry
2015/0317626 A1 11/2015 Ran et al.
2015/0332266 A1 11/2015 Friedlander et al.
2015/0339474 A1 11/2015 Paz et al.
2015/0371234 A1 12/2015 Huang et al.
2016/0012465 A1 1/2016 Sharp
2016/0026997 A1 1/2016 Tsui et al.
2016/0048913 A1 2/2016 Rausaria et al.
2016/0055480 A1 2/2016 Shah
2016/0057619 A1 2/2016 Lopez
2016/0065370 A1 3/2016 Le Saint et al.
2016/0078430 A1 3/2016 Douglas
2016/0087957 A1 3/2016 Shah et al.
2016/0092696 A1 3/2016 Guglani et al.
2016/0148193 A1 5/2016 Kelley et al.
2016/0189143 A1 6/2016 Koeppel
2016/0232523 A1 8/2016 Venot et al.
2016/0239672 A1 8/2016 Khan et al.
2016/0253651 A1 9/2016 Park et al.
2016/0255072 A1 9/2016 Liu
2016/0267486 A1 9/2016 Mitra et al.
2016/0277383 A1 9/2016 Guyomarc'H et al.
2016/0277388 A1 9/2016 Lowe et al.
2016/0307187 A1 10/2016 Guo et al.
2016/0307189 A1 10/2016 Zarakas et al.
2016/0314472 A1 10/2016 Ashfield
2016/0330027 A1 11/2016 Ebrahimi
2016/0335531 A1 11/2016 Mullen et al.
2016/0379217 A1 12/2016 Hammad
2017/0004502 A1 1/2017 Quentin et al.
2017/0011395 A1 1/2017 Pillai et al.
2017/0011406 A1 1/2017 Tunnell et al.
2017/0017957 A1 1/2017 Radu
2017/0017964 A1 1/2017 Janefalkar et al.
2017/0024716 A1 1/2017 Jiam et al.
2017/0039566 A1 2/2017 Schipperheijn
2017/0041759 A1 2/2017 Gantert et al.
2017/0068950 A1 3/2017 Kwon
2017/0103388 A1 4/2017 Pillai et al.
2017/0104739 A1 4/2017 Lansler et al.
2017/0109509 A1 4/2017 Baghdasaryan
2017/0109730 A1 4/2017 Locke et al.
2017/0116447 A1 4/2017 Cimino et al.
2017/0124568 A1 5/2017 Moghadam
2017/0140379 A1 5/2017 Deck
2017/0154328 A1 6/2017 Zarakas et al.
2017/0154333 A1 6/2017 Gleeson et al.
2017/0180134 A1 6/2017 King
2017/0230189 A1 8/2017 Toll et al.
2017/0237301 A1 8/2017 Elad et al.
2017/0289127 A1 10/2017 Hendrick
2017/0295013 A1 10/2017 Claes
2017/0316696 A1 11/2017 Bartel
2017/0317834 A1 11/2017 Smith et al.
2017/0330173 A1 11/2017 Woo et al.
2017/0374070 A1 12/2017 Shah et al.

(56) References Cited

U.S. PATENT DOCUMENTS

2018/0034507 A1 2/2018 Wobak et al.
2018/0039986 A1 2/2018 Essebag et al.
2018/0039987 A1 2/2018 Molino
2018/0068316 A1 3/2018 Essebag et al.
2018/0114036 A1 4/2018 Spodak et al.
2018/0129945 A1 5/2018 Saxena et al.
2018/0160255 A1 6/2018 Park
2018/0191501 A1 7/2018 Lindemann
2018/0205712 A1 7/2018 Versteeg et al.
2018/0240106 A1 8/2018 Garrett et al.
2018/0254909 A1 9/2018 Hancock
2018/0268132 A1 9/2018 Buer et al.
2018/0270214 A1 9/2018 Caterino et al.
2018/0294959 A1 10/2018 Traynor et al.
2018/0300716 A1 10/2018 Carlson
2018/0302396 A1 10/2018 Camenisch et al.
2018/0315050 A1 11/2018 Hammad
2018/0316666 A1 11/2018 Koved et al.
2018/0322486 A1 11/2018 Deliwala et al.
2018/0359100 A1 12/2018 Gaddam et al.
2019/0014107 A1 1/2019 George
2019/0019375 A1 1/2019 Foley
2019/0036678 A1 1/2019 Ahmed
2019/0172055 A1 6/2019 Hale
2019/0238517 A1 8/2019 D'Agostino et al.
2019/0251561 A1 8/2019 Oosthuizen
2019/0303945 A1 10/2019 Mitra
2021/0004806 A1 1/2021 Noe
2021/0272098 A1 9/2021 Delsuc
2021/0304189 A1 9/2021 Gupta
2021/0383360 A1 12/2021 Sinha
2021/0406869 A1 12/2021 Pathrabe
2022/0051237 A1 2/2022 Karpenko et al.
2022/0114581 A1 4/2022 Upadhye
2022/0284416 A1* 9/2022 Rule .................... G06Q 20/352
2022/0309509 A1 9/2022 Akgun
2022/0335412 A1 10/2022 Rule
2022/0366410 A1 11/2022 Rule
2022/0398566 A1 12/2022 Rule
2022/0414648 A1 12/2022 Rule
2023/0054157 A1 2/2023 Mao
2023/0065163 A1 3/2023 Vargas
2023/0083785 A1 3/2023 Maiman
2023/0169505 A1 6/2023 Rule
2023/0267449 A1* 8/2023 Cook ....................... H04B 5/72
705/35
2023/0354020 A1 11/2023 Rule
2023/0359839 A1 11/2023 Lovgren

FOREIGN PATENT DOCUMENTS

CN 103023643 A 4/2013
CN 103417202 A 12/2013
EP 1085424 A1 3/2001
EP 1223565 A1 7/2002
EP 1265186 A2 12/2002
EP 1783919 A1 5/2007
EP 2139196 A1 12/2009
EP 1469419 A1 8/2012
EP 2852070 A1 3/2015
GB 2457221 A 8/2009
GB 2516861 A 2/2015
GB 2551907 A 1/2018
KR 101508320 B1 4/2015
KR 20150140132 A 12/2015
WO 9910824 A1 3/1999
WO 0049586 A1 8/2000
WO 2006070189 A2 7/2006
WO 2008055170 A2 5/2008
WO 2009025605 A2 2/2009
WO 2010049252 A1 5/2010
WO 2011112158 A1 9/2011
WO 2012001624 A1 1/2012
WO 2013039395 A1 3/2013
WO 2013155562 A1 10/2013
WO 2013192358 A2 12/2013
WO 2014043278 A1 3/2014
WO 2014170741 A2 10/2014
WO 2015179649 A1 11/2015
WO 2015183818 A1 12/2015
WO 2016097718 A1 6/2016
WO 2016160816 A1 10/2016
WO 2016168394 A1 10/2016
WO 2017042375 A1 3/2017
WO 2017042400 A1 3/2017
WO 2017047855 A1 3/2017
WO 2017157859 A1 9/2017
WO 2017208063 A1 12/2017
WO 2018063809 A1 4/2018
WO 2018137888 A1 8/2018
WO 2019022585 A1 1/2019
WO 2021051884 A1 3/2021
WO 2021133492 A1 7/2021
WO 2022108959 A1 5/2022
WO 2022187350 A1 9/2022
WO 2023017943 A1 2/2023
WO 2023064063 A1 4/2023

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

(56) References Cited

OTHER PUBLICATIONS

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., " The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE Africon at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera Slam", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card User Authentication for Contactless Smart Cards based on Gesture Recognition", paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.
The International Search Report and Written Opinion mailed Jul. 16, 2024, for corresponding PCT/US24/23551, nine (9) pages).
Author Unknown, "Global expansion of card tapping mobile OTP for security and convenience is imminent," Jun. 28, 2022, website: https://www.swidch.com/blogs/card-tapping-motp-blog.
Emvco: "EMV Card Personalisation Specification", Aug. 1, 2021, pp. 1-114, Retrieved from the Internet: URL: https://www.emvco.com/specification/?post_id=12467.
Saush, "Getting information from an EMV chip card with Java," Sep. 8, 2006, WordPress, pp. 1-13.
Smart Card Alliance, "Co-Branded Multi-Application Contactless Cards for Transit and Financial Payment," A Smart Card Alliance Transportation Council White Paper (40 pages), Mar. 2008.

* cited by examiner

SYSTEMS AND METHODS FOR DIGITAL ENROLLMENT RESPONSIVE TO SATISFYING PREDETERMINED CONDITIONS

BACKGROUND

Systems and methods for digitally enrolling credit cards with a mobile application are known in the art and require a plurality of different types of user action. For example, a customer must first enter personal information into a user interface of the mobile application, including name, date of birth, and social security number, which the mobile application uses to locate a credit card or other product associated with the customer. Then, the customer must enter user input to create a new user name or link to an existing user name, including creating or entering a password, to create or link to a customer account. Once the user name and password have been provided, the customer must enter still further user input, including an email address and a phone number or confirmation of the email address and the phone number previously provided, to add contact points to the customer account. Finally, the customer must verify his or her identity by either receiving a temporary code via a text message and entering that temporary code into the mobile application or entering a card verification value (CVV) number on the credit card into the mobile application to link the credit card to the customer account.

The above-identified and other known systems and methods to digitally enroll the credit card with the mobile application can require as many as 12 actions that the customer must execute. In addition to being generally undesirable and cumbersome, such systems and methods are prone to user error and fraud.

BRIEF SUMMARY

In some embodiments, a method can include receiving, by a wireless card reader of a mobile device, a network address from a contactless card, accessing, via a mobile application executing on the mobile device, a web page at the network address, receiving, by a short-range communication antenna of the mobile device, a cryptogram from the contactless card, identifying, by a processor of the mobile device and based on the cryptogram, a customer account associated with the contactless card, and verifying, by the processor of the mobile device, that a phone number of the mobile device is associated with the customer account. When the phone number of the mobile device has been verified as being associated with the customer account, the method can include receiving, via the mobile application executing on the mobile device, user input for accessing the customer account and enrolling, by the processor of the mobile device, the contactless card with the mobile application for digitally accessing the customer account via the mobile application.

In some embodiments, the method can include scanning, via the wireless card reader of the mobile device, a two-dimensional data code, such as a Quick Response code (e.g., a QR code®) or a sticker on the contactless card or a paper associated with the contactless card to receive the network address from the contactless card.

In some embodiments, responsive to accessing the web page at the network address via the mobile application executing on the mobile device, the method can include displaying, on a display device of the mobile device, a solicitation for communication with the contactless card.

In some embodiments, the method can include successfully decrypting the cryptogram to identify the customer account associated with the contactless card. For example, in some embodiments, the method can include decrypting protected data in the cryptogram, comparing the protected data to stored record data associated with the contactless card, and identifying the customer account based on a match between the protected data and the stored record data.

In some embodiments, the method can include transmitting the cryptogram from the mobile device to a server and receiving, at the mobile device, an indication that the phone number of the mobile device is associated with the customer account. In some embodiments, the method can include transmitting a message from the mobile device to the server, wherein the message can include the cryptogram and the phone number of the mobile device.

In some embodiments, when the phone number of the mobile device has been verified as being associated with the customer account, the method can include displaying, on a display device of the mobile device, a user name for the customer account and a solicitation for a password for the customer account to create or log into the customer account.

In some embodiments, a non-transitory computer-readable medium can include instructions that, when executed by a processor, can cause the processor to receive, via a wireless card reader of a mobile device, a network address from a contactless card, access, via a mobile application executing on the mobile device, a web page at the network address, receive, via a short-range communication antenna of the mobile device, a cryptogram from the contactless card, identify a customer account associated with the contactless card, and verify that a phone number of the mobile device is associated with the customer account. When the phone number of the mobile device has been verified as being associated with the customer account, the instructions can further cause the processor to receive, via the mobile application executing on the mobile device, user input for accessing the customer account and enroll the contactless card with the mobile application for digitally accessing the customer account via the mobile application.

In some embodiments, the instructions can further cause the processor to receive the network address from the contactless card via the wireless card reader of the mobile device scanning a two-dimensional data code, such as a Quick Response code (e.g., a QR code®) or a sticker on the contactless card or a paper associated with the contactless card.

In some embodiments, responsive to accessing the web page at the network address via the mobile application executing on the mobile device, the instructions can further cause the processor to display, on a display device of the mobile device, a solicitation for communication with the contactless card.

In some embodiments, the instructions can further cause the processor to successfully decrypt the cryptogram to identify the customer account associated with the contactless card. For example, in some embodiments, the instructions can further cause the processor to decrypt protected data in the cryptogram, compare the protected data to stored record data associated with the contactless card, and identify the customer account based on a match between the protected data and the stored record data.

In some embodiments, the instructions can further cause the processor to transmit the cryptogram to a server and receive an indication that the phone number of the mobile device is associated with the customer account. In some embodiments, the instructions can further cause the processor to transmit a message to the server, wherein the message includes the cryptogram and the phone number of the mobile device.

In some embodiments, when the phone number of the mobile device has been verified as being associated with the customer account, the instructions can further cause the processor to display, on a display device of the mobile device, a user name for the customer account and a solicitation for a password for the customer account to create or log into the customer account.

In some embodiments, a mobile device can includes a wireless card reader, a short-range communication antenna, and a memory storing instructions that, when executed by the processor, can cause the processor to receive, via the wireless card reader, a network address from a contactless card, access, via a mobile application executing on the mobile device, a web page at the network address, receive, via the short-range communication antenna, a cryptogram from the contactless card, identify a customer account associated with the contactless card, and verify that a phone number of the mobile device is associated with the customer account. When the phone number of the mobile device has been verified as being associated with the customer account, the instructions can further cause the processor to receive, via the mobile application executing on the mobile device, user input for accessing the customer account and enroll the contactless card with the mobile application for digitally accessing the customer account via the mobile application.

In some embodiments, the mobile device can also include a display device, and the instructions can further cause the processor to display, on the display device, a solicitation for communication with the contactless card.

In some embodiments, the instructions can further cause the processor to successfully decrypt the cryptogram to identify the customer account associated with the contactless card.

In some embodiments, the mobile device can also include a display device. When the phone number of the mobile device has been verified as being associated with the customer account, the instructions can further cause the processor to display, on the display device, a user name for the customer account and a solicitation for a password for the customer account to create or log into the customer account.

Other technical features may be readily apparent to one skilled in the art from the following figures, descriptions, and claims.

DETAILED DESCRIPTION

Figure 1:
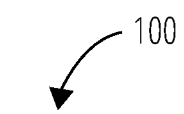
FIG. 1 illustrates an example of a system in accordance with one embodiment.
Figure 1:
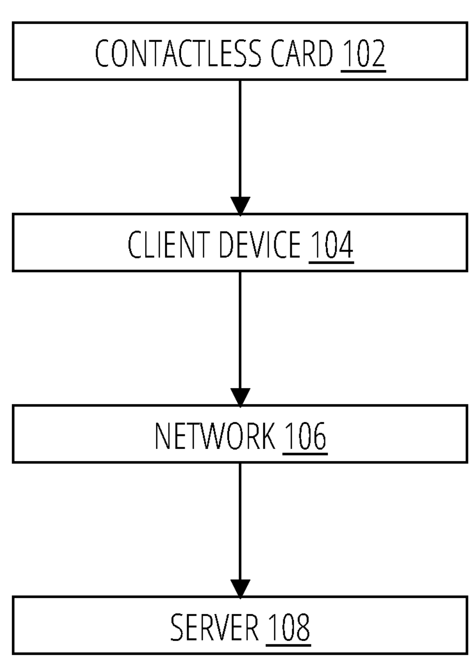

Embodiments disclosed herein are generally directed to systems and methods for digital enrollment responsive to satisfying predetermined conditions. For example, when a customer receives a contactless card, such as a credit card, in the mail or otherwise, the customer can use a mobile device, such as a cellular phone, to digitally enroll the contactless card with a mobile application associated with a bank or a company that issued the contactless card for digitally accessing the customer account via the mobile application. The predetermined conditions that can be satisfied prior to digitally enrolling the contactless card with the mobile application can include confirmation that the customer is in possession of both the contactless card and the mobile device.

Specifically, the contactless card or a paper associated with the contactless card can include a code, such as a two-dimensional data code, such as a Quick Response code (e.g., a QR code®) that can be scanned, read, or otherwise recognized by a wireless card reader of a mobile device. The code can include a network address embedded therein, and the mobile device can receive the network address by scanning or reading the code. Responsive to receiving the network address from the contactless card, the mobile application executing on the mobile device can access a web page at the network address and display, on a display device of the mobile device, a solicitation for communication with the contactless card. The customer can tap or otherwise bring the contactless card within a communication range of the mobile device, and a short-range communication antenna of the mobile device can receive a cryptogram from the contactless card. Based on the cryptogram, a processor of the mobile device can identify a customer account associated with the contactless card and verify that a phone number of the mobile device is associated with the customer account. In this regard, systems and methods disclosed herein can perform a proof of profession check to ensure that the customer is in possession of both the contactless card and the mobile device.

When the phone number of the mobile device has been verified as being associated with the customer account, the mobile application can receive user input for accessing the customer account, including a user name and/or a password for the customer account. Then, the processor of the mobile device can enroll the contactless card with the mobile application for digitally accessing the customer account via the mobile application.

Advantageously, systems and methods disclosed herein can reduce and minimize a number of actions that the customer must execute to digitally enroll the contactless card with the mobile application and, therefore, reduce and minimize an amount of user input that the processor of the mobile device and/or a server in communication with the mobile device must process. For example, in some embodiments, the customer need only execute 3 actions: placing the code within a field of view of the wireless card reader of the mobile device, placing the contactless card within the communication range of the short-range communication antenna of the mobile device, and entering a user name and/or a password for the customer account into the mobile device. Similarly, in some embodiments, the processor of the mobile device and/or the server need only process 4 pieces of user input—the code, the cryptogram, the phone number of the mobile device, and the user name and/or the password for the customer account—thereby decreasing processing time and power consumed.

Additional advantages of embodiments disclosed herein can include enhanced security and accuracy as compared to known systems and methods, thereby preventing or reducing occurrences of fraud. Indeed, systems and methods disclosed herein do not require the customer to enter identifying personal information into the mobile application. Nevertheless, systems and methods disclosed herein can reasonably ensure that the customer has possession of both the contactless card and the mobile device before digitally enrolling the contactless card with the mobile application. Indeed, by using the cryptogram received from the contactless card to identify the customer account and verifying that the phone number of the mobile device receiving the cryptogram is associated with the customer account, systems and methods disclosed herein can confirm that the customer has possession of both the contactless card and the mobile device, thereby preventing a bad actor in possession of only the contactless card or only the mobile device from digitally enrolling with the mobile application.

Details of the above-identified embodiments and additional advantages thereof are discussed in the following description.

FIG. 1 illustrates a data transmission system 100 according to an example embodiment. As further discussed below, system 100 may include contactless card 102, client device 104, network 106, and server 108. Although FIG. 1 illustrates single instances of the components, system 100 may include any number of components.

System 100 may include one or more contactless cards 102, which are further explained below. In some embodiments, contactless card 102 may be in wireless communication, utilizing Near-Field Communication (NFC) in an example, with client device 104.

System 100 may include client device 104, which may be a network-enabled computer. As referred to herein, a network-enabled computer may include, but is not limited to a computer device, or communications device including, e.g., a server, a network appliance, a personal computer, a workstation, a phone, a handheld personal computer (PC), a personal digital assistant, a thin client, a fat client, an Internet browser, or other device. Client device 104 also may be a mobile device; for example, a mobile device may include an iPhone, iPod, iPad from Apple® or any other mobile device running Apple's iOS® operating system, any device running Microsoft's Windows® mobile operating system, any device running Google's Android® operating system, and/or any other smartphone, tablet, or like wearable mobile device.

The client device 104 device can include a processor and a memory, and it is understood that the processing circuitry may contain additional components, including processors, memories, error and parity/cyclic redundancy check (CRC) checkers, data encoders, anticollision algorithms, controllers, command decoders, security primitives and tamperproofing hardware, as necessary to perform the functions described herein. The client device 104 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch screen, keyboard, mouse, cursor-control device, touch screen, microphone, digital camera, video recorder or camcorder. These devices may be used to enter information and interact with the software and other devices described herein.

In some examples, client device 104 of system 100 may execute one or more applications, such as software applications, that enable, for example, network communications with one or more components of system 100 and transmit and/or receive data.

The client device 104 may be in communication with one or more server(s) 108 via one or more network(s) 106 and may operate as a respective front-end to back-end pair with server 108. The client device 104 may transmit, for example from a mobile device application executing on client device 104, one or more requests to server 108. The one or more requests may be associated with retrieving data from server 108. The server 108 may receive the one or more requests from client device 104. Based on the one or more requests from client device 104, server 108 may be configured to retrieve the requested data from one or more databases (not shown). Based on receipt of the requested data from the one or more databases, server 108 may be configured to transmit the received data to client device 104, the received data being responsive to one or more requests.

System 100 may include one or more networks 106. In some examples, network 106 may be one or more of a wireless network, a wired network or any combination of wireless network and wired network and may be configured to connect client device 104 to server 108. For example, network 106 may include one or more of a fiber optics network, a passive optical network, a cable network, an Internet network, a satellite network, a wireless local area network (LAN), a Global System for Mobile Communication, a Personal Communication Service, a personal area network (PAN), Wireless Application Protocol, Multimedia Messaging Service, Enhanced Messaging Service, Short Message Service, Time Division Multiplexing based systems, Code Division Multiple Access based systems, Digital Advanced Mobile Phone System (D-AMPS), Wi-Fi (Wireless Fidelity), Fixed Wireless Data, Institute of Electrical and Electronics Engineers (IEEE) 802.11 family of networking, Bluetooth, NFC, Radio Frequency Identification (RFID), and/or the like.

In addition, network 106 may include, without limitation, telephone lines, fiber optics, IEEE Ethernet 802.3, a wide area network (WAN), a wireless PAN, a LAN, or a global network such as the Internet. In addition, network 106 may support an Internet network, a wireless communication network, a cellular network, or the like, or any combination thereof. Network 106 may further include one network, or any number of the exemplary types of networks mentioned above, operating as a stand-alone network or in cooperation with each other. Network 106 may utilize one or more protocols of one or more network elements to which they are communicatively coupled. Network 106 may translate to or from other protocols to one or more protocols of network devices. Although network 106 is depicted as a single network, it should be appreciated that according to one or more examples, network 106 may comprise a plurality of interconnected networks, such as, for example, the Internet, a service provider's network, a cable television network, corporate networks, such as credit card association networks, and home networks.

System 100 may include one or more servers 108. In some examples, server 108 may include one or more processors, which are coupled to memory. The server 108 may be configured as a central system, server or platform to control and call various data at different times to execute a plurality of workflow actions. Server 108 may be configured to connect to the one or more databases. The server 108 may be connected to at least one client device 104.

Figure 2:
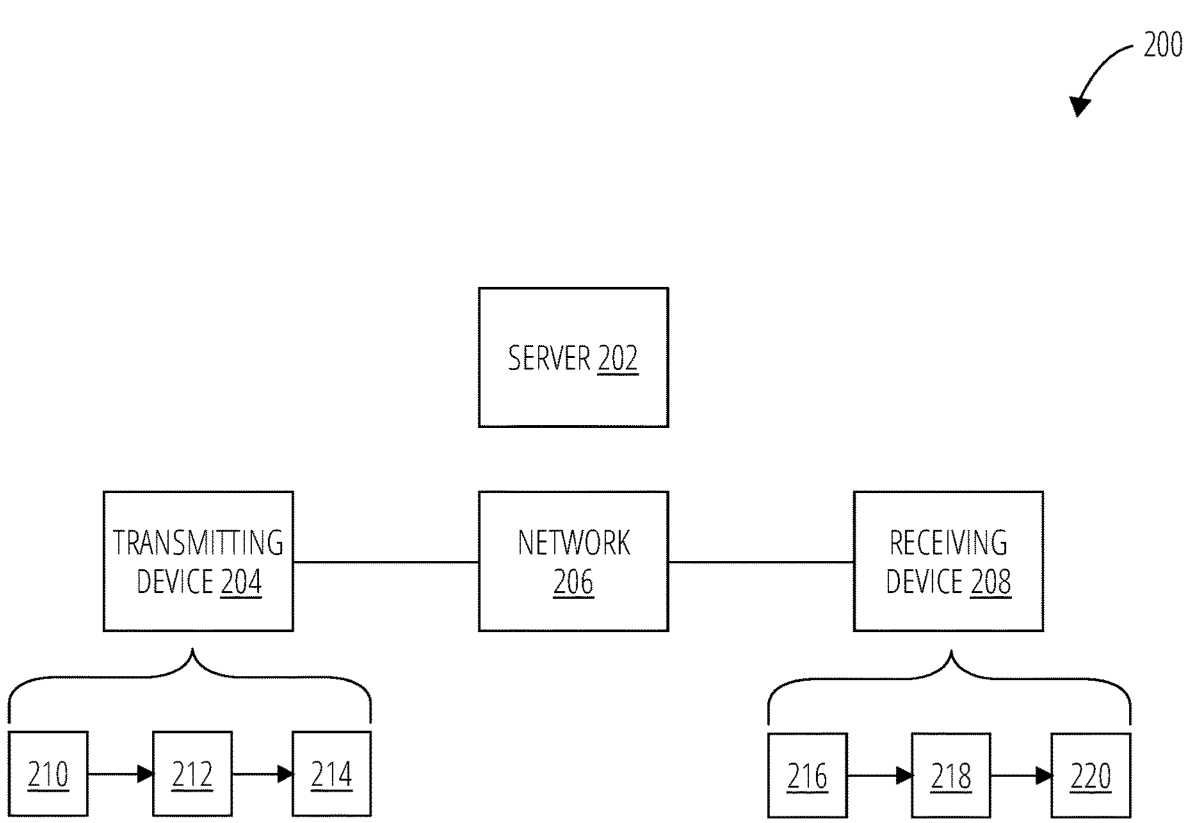
FIG. 2 illustrates an example of a system in accordance with one embodiment.

FIG. 2 illustrates a data transmission system according to an example embodiment. System 200 may include a transmitter or transmitting device 204, a receiver or receiving device 208 in communication, for example, via network 206, with one or more servers 202. Transmitter or transmitting device 204 may be the same as, or similar to, client device 104 discussed above with reference to FIG. 1. Receiver or receiving device 208 may be the same as, or similar to, client device 104 discussed above with reference to FIG. 1. Network 206 may be similar to network 106 discussed above with reference to FIG. 1. Server 202 may be similar to server 108 discussed above with reference to FIG. 1. Although FIG. 2 shows single instances of components of system 200, system 200 may include any number of the illustrated components.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key is used or reused too frequently, that key may be compromised. Each time the key is used, it provides an attacker an additional sample of data which was processed by the cryptographic algorithm using the same key. The more data which the attacker has which was processed with the same key, the greater the likelihood that the attacker may discover the value of the key. A key used frequently may be comprised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key will be used, the amount of side-channel data which the attacker is able to gather is limited and thereby reduces exposure to this and other types of attack. As further described herein, the parties involved in the exchange of cryptographic information (e.g., sender and recipient) can independently generate keys from an initial shared master symmetric key in combination with a counter value, and thereby periodically replace the shared symmetric key being used without needing to resort to any form of key exchange to keep the parties in sync. By periodically changing the shared secret symmetric key used by the sender and the recipient, the attacks described above are rendered impossible.

Referring back to FIG. 2, system 200 may be configured to implement key diversification. For example, a sender and recipient may desire to exchange data (e.g., original sensitive data) via respective transmitting devices 204 and receiving devices 208. As explained above, although single instances of transmitting device 204 and receiving device 208 may be included, it is understood that one or more transmitting devices 204 and one or more receiving devices 208 may be involved so long as each party shares the same shared secret symmetric key. In some examples, the transmitting device 204 and the receiving device 208 may be provisioned with the same master symmetric key. Further, it is understood that any party or device holding the same secret symmetric key may perform the functions of the transmitting device 204 and similarly any party holding the same secret symmetric key may perform the functions of the receiving device 208. In some examples, the symmetric key may comprise the shared secret symmetric key which is kept secret from all parties other than the transmitting device 204 and the receiving device 208 involved in exchanging the secure data. It is further understood that both the transmitting device 204 and the receiving device 208 may be provided with the same master symmetric key, and further that part of the data exchanged between the transmitting device 204 and the receiving device 208 comprises at least a portion of data which may be referred to as the counter value. The counter value may comprise a number that changes each time data is exchanged between the transmitting device 204 and the receiving device 208.

System 200 may include one or more networks 206. In some examples, network 206 may be one or more of a wireless network, a wired network or any combination of wireless network and wired network and may be configured to connect one or more transmitting devices 204 and one or more receiving devices 208 to server 202. For example, network 206 may include one or more of a fiber optics network, a passive optical network, a cable network, an Internet network, a satellite network, a wireless LAN, a Global System for Mobile Communication, a Personal Communication Service, a PAN, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family network, Bluetooth, NFC, RFID, and/or the like.

In addition, network 206 may include, without limitation, telephone lines, fiber optics, IEEE Ethernet 902.3, a WAN, a wireless PAN, a LAN, or a global network such as the Internet. In addition, network 206 may support an Internet network, a wireless communication network, a cellular network, or the like, or any combination thereof. Network 206 may further include one network, or any number of the exemplary types of networks mentioned above, operating as a stand-alone network or in cooperation with each other. Network 206 may utilize one or more protocols of one or more network elements to which they are communicatively coupled. Network 206 may translate to or from other protocols to one or more protocols of network devices. Although network 206 is depicted as a single network, it should be appreciated that according to one or more examples, network 206 may comprise a plurality of interconnected networks, such as, for example, the Internet, a service provider's network, a cable television network, corporate networks, such as credit card association networks, and home networks.

In some examples, one or more transmitting devices 204 and one or more receiving devices 208 may be configured to communicate and transmit and receive data between each other without passing through network 206. For example, communication between the one or more transmitting devices 204 and the one or more receiving devices 208 may occur via at least one of NFC, Bluetooth, RFID, Wi-Fi, and/or the like.

At block 210, when the transmitting device 204 is preparing to process the sensitive data with symmetric cryptographic operation, the sender may update a counter. In addition, the transmitting device 204 may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as Triple Data Encryption Standard (3DES) or Advanced Encryption Standard (AES) 128 (AES128); a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

At block 212, the transmitting device 204 may take the selected cryptographic algorithm, and using the master symmetric key, process the counter value. For example, the sender may select a symmetric encryption algorithm, and use a counter which updates with every conversation between the transmitting device 204 and the receiving device 208. The transmitting device 204 may then encrypt the counter value with the selected symmetric encryption algorithm using the master symmetric key, creating a diversified symmetric key.

In some examples, the counter value may not be encrypted. In these examples, the counter value may be transmitted between the transmitting device 204 and the receiving device 208 at block 212 without encryption.

At block 214, the diversified symmetric key may be used to process the sensitive data before transmitting the result to the receiving device 208. For example, the transmitting device 204 may encrypt the sensitive data using a symmetric encryption algorithm using the diversified symmetric key, with the output comprising the protected encrypted data. The transmitting device 204 may then transmit the protected encrypted data, along with the counter value, to the receiving device 208 for processing.

At block 216, the receiving device 208 may first take the counter value and then perform the same symmetric encryption using the counter value as input to the encryption, and the master symmetric key as the key for the encryption. The output of the encryption may be the same diversified symmetric key value that was created by the sender.

At block 218, the receiving device 208 may then take the protected encrypted data and using a symmetric decryption algorithm along with the diversified symmetric key, decrypt the protected encrypted data.

At block 220, as a result of decrypting the protected encrypted data, the original sensitive data may be revealed.

The next time sensitive data needs to be sent from the sender to the recipient via respective transmitting device 204 and receiving device 208, a different counter value may be selected producing a different diversified symmetric key. By processing the counter value with the master symmetric key and same symmetric cryptographic algorithm, both the transmitting device 204 and the receiving device 208 may independently produce the same diversified symmetric key. This diversified symmetric key, not the master symmetric key, is used to protect the sensitive data.

As explained above, both the transmitting device 204 and the receiving device 208 each initially possess the shared master symmetric key. The shared master symmetric key is not used to encrypt the original sensitive data. Because the diversified symmetric key is independently created by both the transmitting device 204 and the receiving device 208, it is never transmitted between the two parties. Thus, an attacker cannot intercept the diversified symmetric key and the attacker never sees any data which was processed with the master symmetric key. Only the counter value is processed with the master symmetric key, not the sensitive data. As a result, reduced side-channel data about the master symmetric key is revealed. Moreover, the operation of the transmitting device 204 and the receiving device 208 may be governed by symmetric requirements for how often to create a new diversification value, and, therefore, a new diversified symmetric key. In an embodiment, a new diversification value and, therefore, a new diversified symmetric key may be created for every exchange between the transmitting device 204 and the receiving device 208.

In some examples, the key diversification value may comprise the counter value. Other non-limiting examples of the key diversification value include: a random nonce generated each time a new diversified key is needed, the random nonce sent from the transmitting device 204 to the receiving device 208; the full value of a counter value sent from the transmitting device 204 and the receiving device 208; a portion of a counter value sent from the transmitting device 204 and the receiving device 208; a counter independently maintained by the transmitting device 204 and the receiving device 208 but not sent between the two devices; a one-time-passcode exchanged between the transmitting device 204 and the receiving device 208; and a cryptographic hash of the sensitive data. In some examples, one or more portions of the key diversification value may be used by the parties to create multiple diversified keys. For example, a counter may be used as the key diversification value. Further, a combination of one or more of the exemplary key diversification values described above may be used.

In another example, a portion of the counter may be used as the key diversification value. If multiple master key values are shared between the parties, the multiple diversified key values may be obtained by the systems and processes described herein. A new diversification value, and therefore a new diversified symmetric key, may be created as often as needed. In the most secure case, a new diversification value may be created for each exchange of sensitive data between the transmitting device 204 and the receiving device 208. In effect, this may create a one-time use key, such as a single-use session key.

Figure 3:
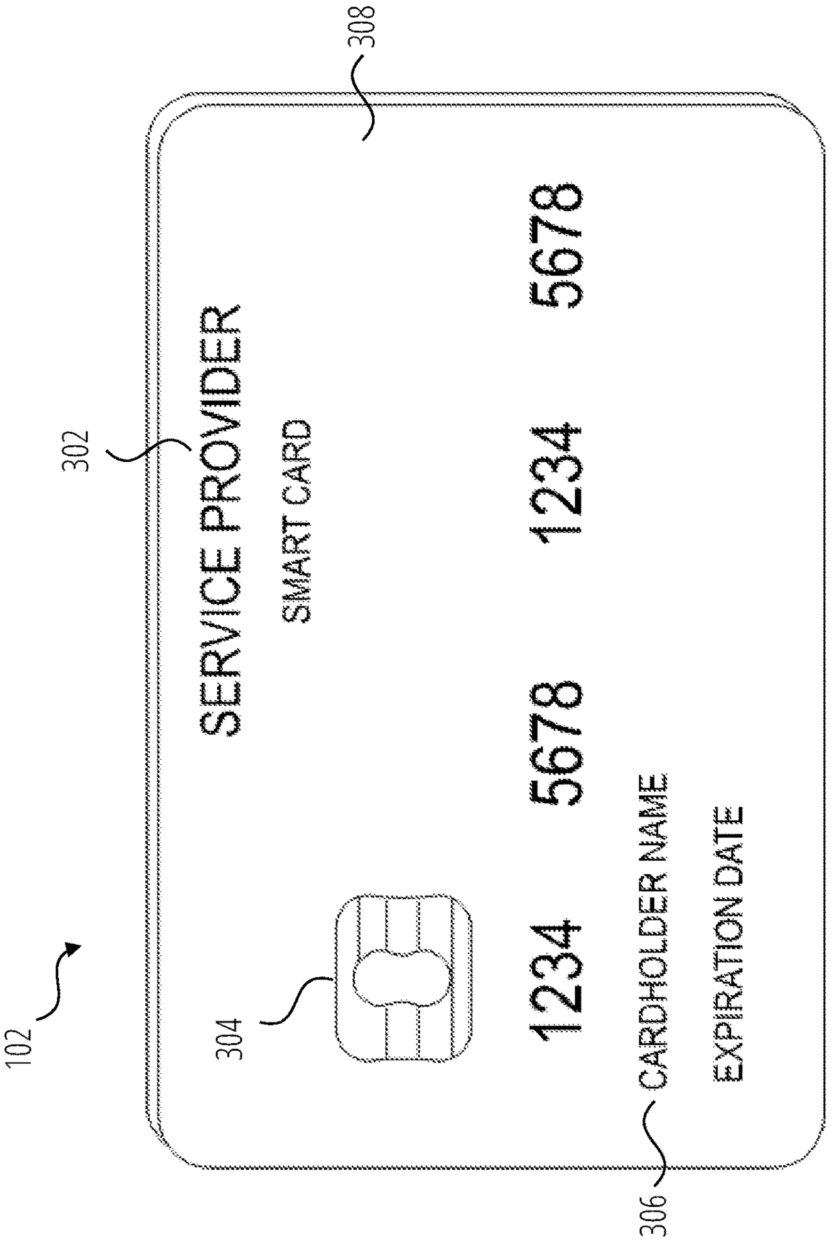
FIG. 3 illustrates an example of a contactless card in accordance with one embodiment.

FIG. 3 illustrates an example configuration of a contactless card 306, which may include a contactless card or a payment card, such as a credit card, debit card, or gift card, issued by a service provider as displayed as service provider indicia 302 on the front or back of the contactless card 306. In some examples, the contactless card 306 is not related to a payment card and may include, without limitation, an identification card. In some examples, the transaction card may include a dual interface contactless payment card, a rewards card, and so forth. The contactless card 306 may include a substrate 310, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 306 may have physical characteristics compliant with the ID-1 format of the International Organization for Standardization (ISO)/ International Electrotechnical Commission (IEC) 7816 (ISO/IEC 7816) standard, and the transaction card may otherwise be compliant with the ISO/IEC 14443 standard. However, it is understood that the contactless card 306 according to the present disclosure may have different characteristics, and the present disclosure does not require a transaction card to be implemented in a payment card.

The contactless card 306 may also include identification information 308 displayed on the front and/or back of the card and a contact pad 304. The contact pad 304 may include one or more pads and be configured to establish contact with another client device, such as an ATM, a user device, smartphone, laptop, desktop, or tablet computer via transaction cards. The contact pad 304 may be designed in accordance with one or more standards, such as the ISO/IEC 7816 standard, and enable communication in accordance with the EMV protocol. The contactless card 306 may also include processing circuitry, antenna and other components as will be further discussed in FIG. 4. These components may be located behind the contact pad 304 or elsewhere on the substrate 310, e.g., within a different layer of the substrate 310, and may be electrically and physically coupled with the contact pad 304. The contactless card 306 may also include a magnetic strip or tape, which may be located on the back of the card (not shown in FIG. 3). The contactless card 306 may also include an NFC device coupled with an antenna capable of communicating via the NFC protocol. Embodiments are not limited in this manner.

Figure 4:
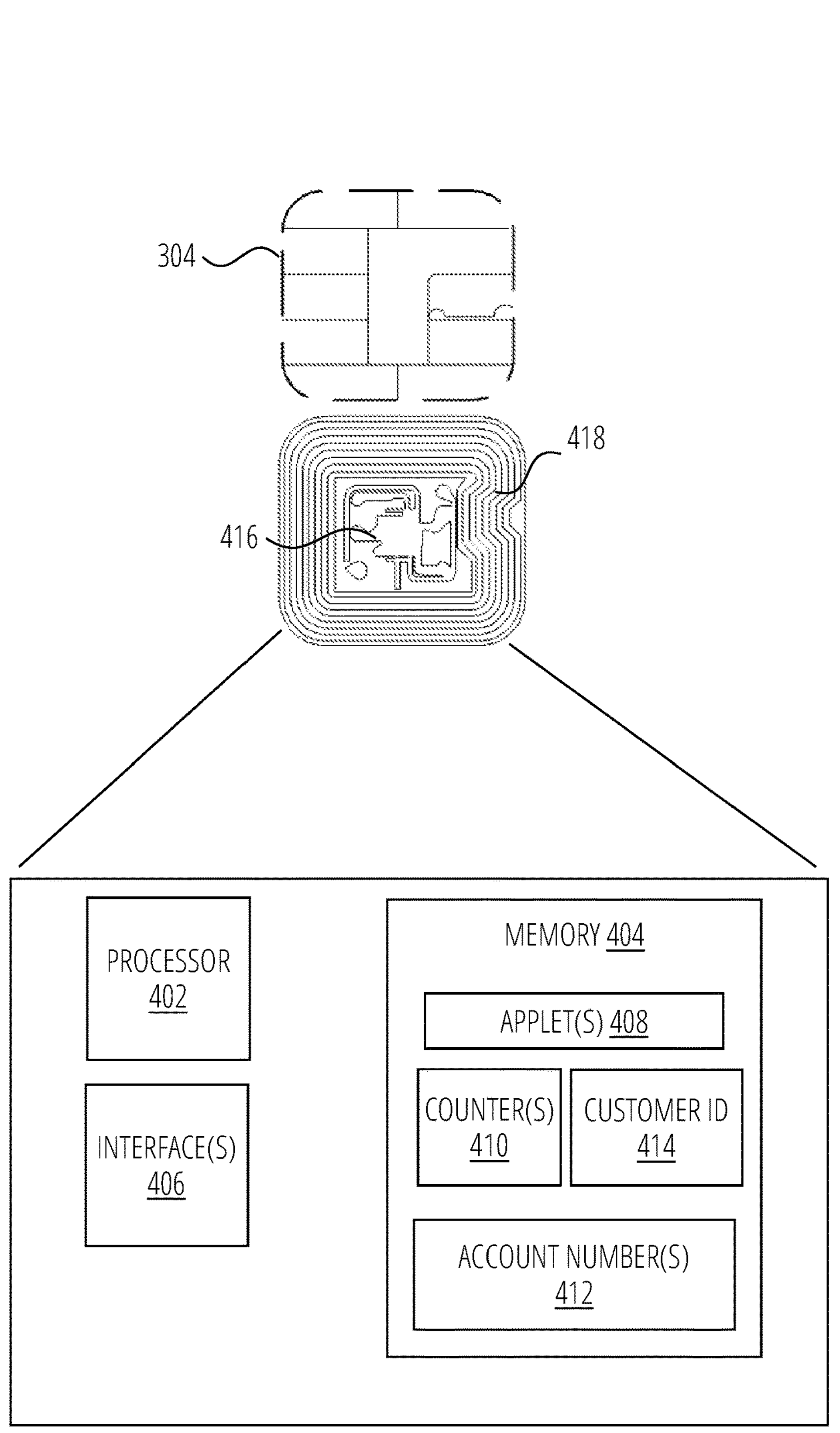
FIG. 4 illustrates an example of a transaction card component in accordance with one embodiment.

As illustrated in FIG. 4, the contact pad 404 of contactless card 102 may include processing circuitry 418 for storing, processing, and communicating information, including a processor 402, a memory 406, and one or more interface(s) 408. It is understood that the processing circuitry 418 may contain additional components, including processors, memories, error and parity/CRC checkers, data encoders, anticollision algorithms, controllers, command decoders, security primitives and tamperproofing hardware, as necessary to perform the functions described herein.

The memory 406 may be a read-only memory (ROM), write-once read-multiple memory or read/write memory, e.g., random-access memory (RAM), ROM, and electrically erasable programmable ROM (EEPROM), and the contactless card 102 may include one or more of these memories. A ROM may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 406 may be encrypted memory utilizing an encryption algorithm executed by the processor 402 to encrypt data.

The memory 406 may be configured to store one or more applet(s) 410, one or more counter(s) 412, a customer identifier 416, and the account number(s) 414, which may be virtual account numbers. The one or more applet(s) 410 may comprise one or more software applications configured to execute on one or more contactless cards, such as a Java® Card applet. However, it is understood that applet(s) 410 are not limited to Java Card applets, and instead may be any software application operable on contactless cards or other devices having limited memory. The one or more counter(s) 412 may comprise a numeric counter sufficient to store an integer. The customer identifier 416 may comprise a unique alphanumeric identifier assigned to a user of the contactless card 102, and the customer identifier 416 may distinguish the user of the contactless card from other contactless card users. In some examples, the customer identifier 416 may identify both a customer and an account assigned to that customer and may further identify the contactless card 102 associated with the customer's account. As stated, the account number(s) 414 may include thousands of one-time use virtual account numbers associated with the contactless card 102. An applet(s) 410 of the contactless card 102 may be configured to manage the account number(s) 414 (e.g., to select an account number(s) 414, mark the selected account number(s) 414 as used, and transmit the account number(s) 414 to a mobile device for autofilling by an autofilling service).

The processor 402 and memory 406 elements of the foregoing exemplary embodiments are described with reference to the contact pad 404, but the present disclosure is not limited thereto. It is understood that these elements may be implemented outside of the contact pad 404 or entirely separate from it, or as further elements in addition to processor 402 and memory 406 elements located within the contact pad 404.

In some examples, the contactless card 102 may comprise one or more antenna(s) 420. The one or more antenna(s) 420 may be placed within the contactless card 102 and around the processing circuitry 418 of the contact pad 404. For example, the one or more antenna(s) 420 may be integral with the processing circuitry 418 and the one or more antenna(s) 420 may be used with an external booster coil. As another example, the one or more antenna(s) 420 may be external to the contact pad 404 and the processing circuitry 418.

In an embodiment, the coil of contactless card 102 may act as the secondary of an air core transformer. A terminal may communicate with the contactless card 102 by cutting power or amplitude modulation. The contactless card 101 may infer the data transmitted from the terminal using the gaps in the contactless card's power connection, which may be functionally maintained through one or more capacitors. The contactless card 102 may communicate back by switching a load on the contactless card's coil or load modulation. Load modulation may be detected in the terminal's coil through interference. More generally, using the antenna(s) 420, processor 402, and/or the memory 406, the contactless card 102 provides a communications interface to communicate via NFC, Bluetooth, and/or Wi-Fi communications.

As explained above, contactless card 102 may be built on a software platform operable on smart cards or other devices having limited memory, such as JavaCard, and one or more or more applications or applets may be securely executed. Applet(s) 410 may be added to contactless cards to provide a one-time password (OTP) for multifactor authentication (MFA) in various mobile application-based use cases. Applet(s) 410 may be configured to respond to one or more requests, such as near field data exchange requests, from a reader, such as a mobile NFC reader (e.g., of a mobile device or point-of-sale terminal), and produce a near field data exchange (NDEF) message that comprises a cryptographically secure OTP encoded as an NDEF text tag.

One example of an NDEF OTP is an NDEF short-record layout (SR=1). In such an example, one or more applet(s) 410 may be configured to encode the OTP as an NDEF type 4 well known type text tag. In some examples, NDEF messages may comprise one or more records. The applet(s) 410 may be configured to add one or more static tag records in addition to the OTP record.

In some examples, the one or more applet(s) 410 may be configured to emulate an RFID tag. The RFID tag may include one or more polymorphic tags. In some examples, each time the tag is read, different cryptographic data is presented that may indicate the authenticity of the contactless card. Based on the one or more applet(s) 410, an NFC read of the tag may be processed, the data may be transmitted to a server, such as a server of a banking system, and the data may be validated at the server.

In some examples, the contactless card 102 and the server may include certain data such that the card may be properly identified. The contactless card 102 may include one or more unique identifiers (not pictured). Each time a read operation takes place, the counter(s) 412 may be configured to increment. In some examples, each time data from the contactless card 102 is read (e.g., by a mobile device), the counter(s) 412 is transmitted to the server for validation and determines whether the counter(s) 412 are equal (as part of the validation) to a counter of the server.

The one or more counter(s) 412 may be configured to prevent a replay attack. For example, if a cryptogram has been obtained and replayed, that cryptogram is immediately rejected if the counter(s) 412 has been read or used or otherwise passed over. If the counter(s) 412 has not been used, it may be replayed. In some examples, the counter that is incremented on the card is different from the counter that is incremented for transactions. The contactless card 102 is unable to determine the application transaction counter(s) 412 since there is no communication between applet(s) 410 on the contactless card 102.

In some examples, the counter(s) 412 may get out of sync. In some examples, to account for accidental reads that initiate transactions, such as reading at an angle, the counter(s) 412 may increment but the application does not process the counter(s) 412. In some examples, when a mobile device 104 is woken up, NFC may be enabled and the device 104 may be configured to read available tags, but no action is taken responsive to the reads.

To keep the counter(s) 412 in sync, an application, such as a background application, may be executed that would be configured to detect when the mobile device 104 wakes up and synchronizes with the server of a banking system indicating that a read that occurred due to detection to then move the counter 412 forward. In other examples, Hashed One Time Password may be utilized such that a window of mis-synchronization may be accepted. For example, if within a threshold of 10, the counter(s) 412 may be configured to move forward. But if within a different threshold number, for example within 10 or 1000, a request for performing re-synchronization may be processed, which requests via one or more applications that the user tap, gesture, or otherwise indicate one or more times via the user's device. If the counter(s) 412 increases in the appropriate sequence, then it possible to know that the user has done so.

The key diversification technique described herein with reference to the counter(s) 412, master key, and diversified key, is one example of encryption and/or decryption in a key diversification technique. This example key diversification technique should not be considered limiting of the disclosure, as the disclosure is equally applicable to other types of key diversification techniques.

During the creation process of the contactless card 102, two cryptographic keys may be assigned uniquely per card. The cryptographic keys may comprise symmetric keys which may be used in both encryption and decryption of data. The 3DES algorithm may be used by EMV, and it is implemented by hardware in the contactless card 102. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 102 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal American Standard Code for Information Interchange (ASCII) format. In another example, the NDEF record may be encoded in hexadecimal format.

Figure 5:
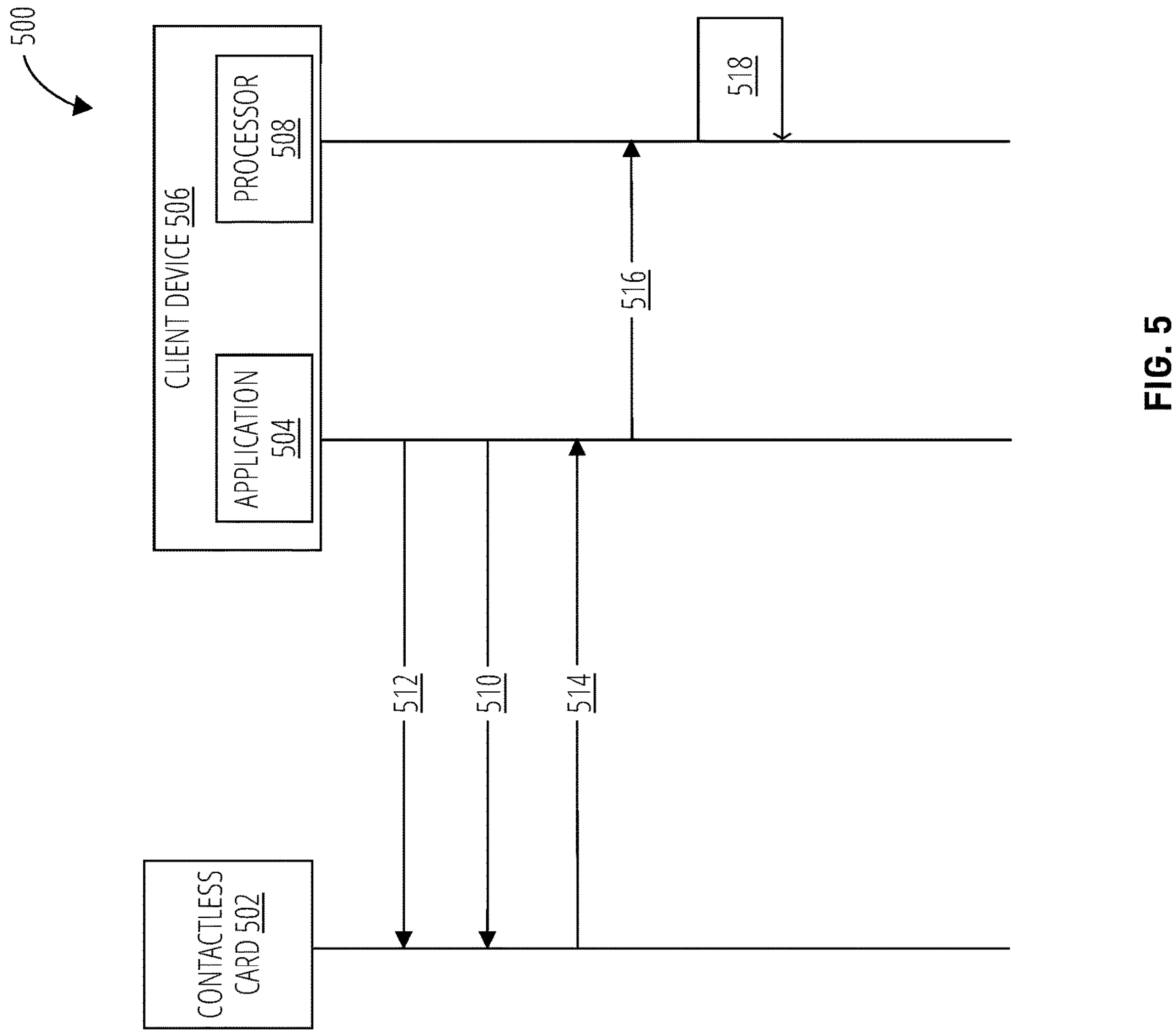
FIG. 5 illustrates an example of a sequence flow in accordance with one embodiment.

FIG. 5 is a timing diagram illustrating an example sequence for providing authenticated access according to one or more embodiments of the present disclosure. Sequence flow 500 may include contactless card 502 and client device 506, which may include an application 504 and processor 508.

At line 512, the application 504 communicates with the contactless card 502 (e.g., after being brought near the contactless card 502). Communication between the application 504 and the contactless card 502 may involve the contactless card 502 being sufficiently close to a card reader (not shown) of the client device 506 to enable NFC data transfer between the application 504 and the contactless card 502.

At line 510, after communication has been established between client device 506 and contactless card 502, contactless card 502 generates a MAC cryptogram. In some examples, this may occur when the contactless card 502 is read by the application 504. In particular, this may occur upon a read, such as an NFC read, of an NDEF tag, which may be created in accordance with the NFC Data Exchange Format. For example, a reader application, such as application 504, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 502 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 504 may be configured to transmit a request to contactless card 502, the request comprising an instruction to generate a MAC cryptogram.

At line 514, the contactless card 502 sends the MAC cryptogram to the application 504. In some examples, the transmission of the MAC cryptogram occurs via NFC, however, the present disclosure is not limited thereto. In other examples, this communication may occur via Bluetooth, Wi-Fi, or other means of wireless data communication. At line 516, the application 504 communicates the MAC cryptogram to the processor 508.

At line 518, the processor 508 verifies the MAC cryptogram pursuant to an instruction from the application 504. For example, the MAC cryptogram may be verified, as explained below. In some examples, verifying the MAC cryptogram may be performed by a device other than client device 506, such as a server of a banking system in data communication with the client device 506. For example, processor 508 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the Rivest-Shamir-Adleman (RSA) algorithm, or zero knowledge protocols, may be used to perform this verification.

Figure 6:
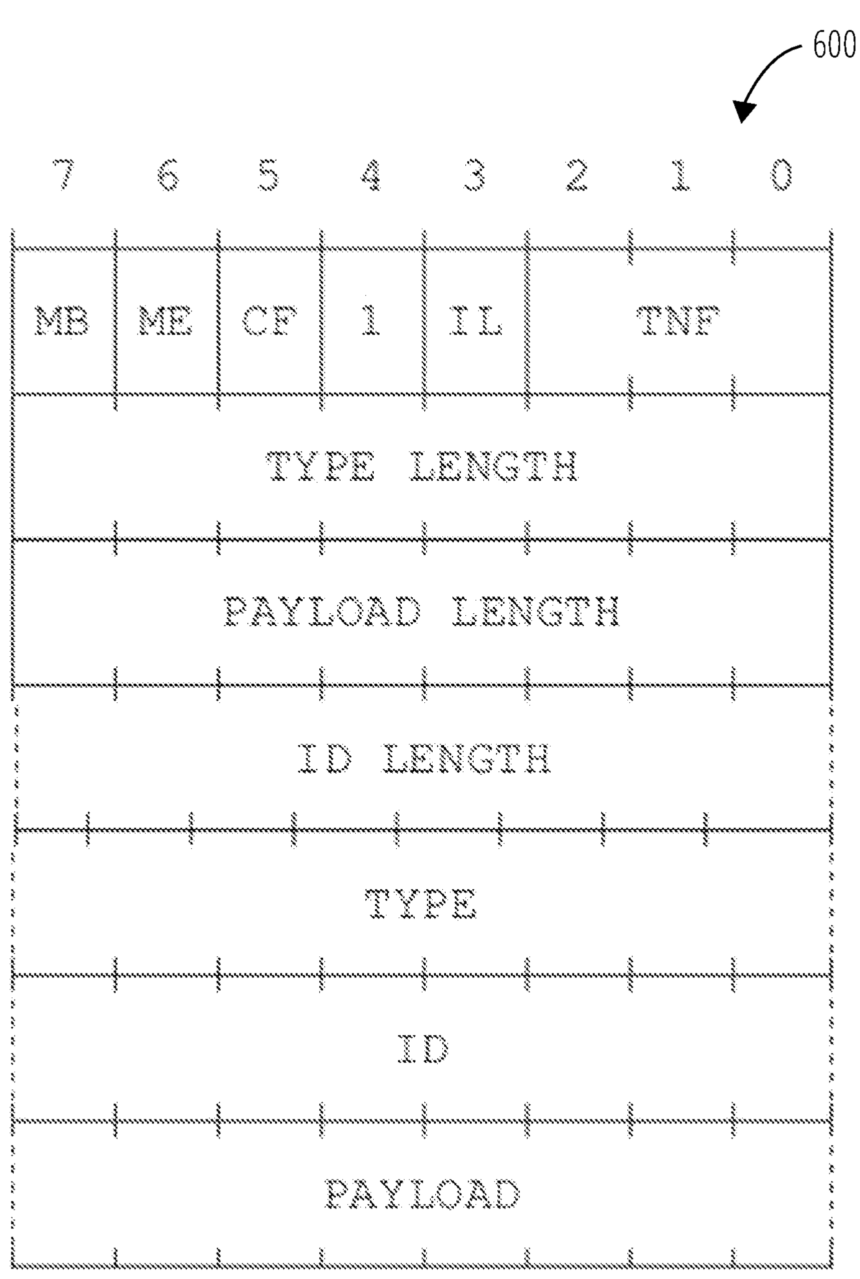
FIG. 6 illustrates an example of a data structure in accordance with one embodiment.

FIG. 6 illustrates an NDEF short-record layout (SR=1) data structure 600 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

Figure 7:
FIG. 7 illustrates an example of a key system in accordance with one embodiment.
Figure 7:
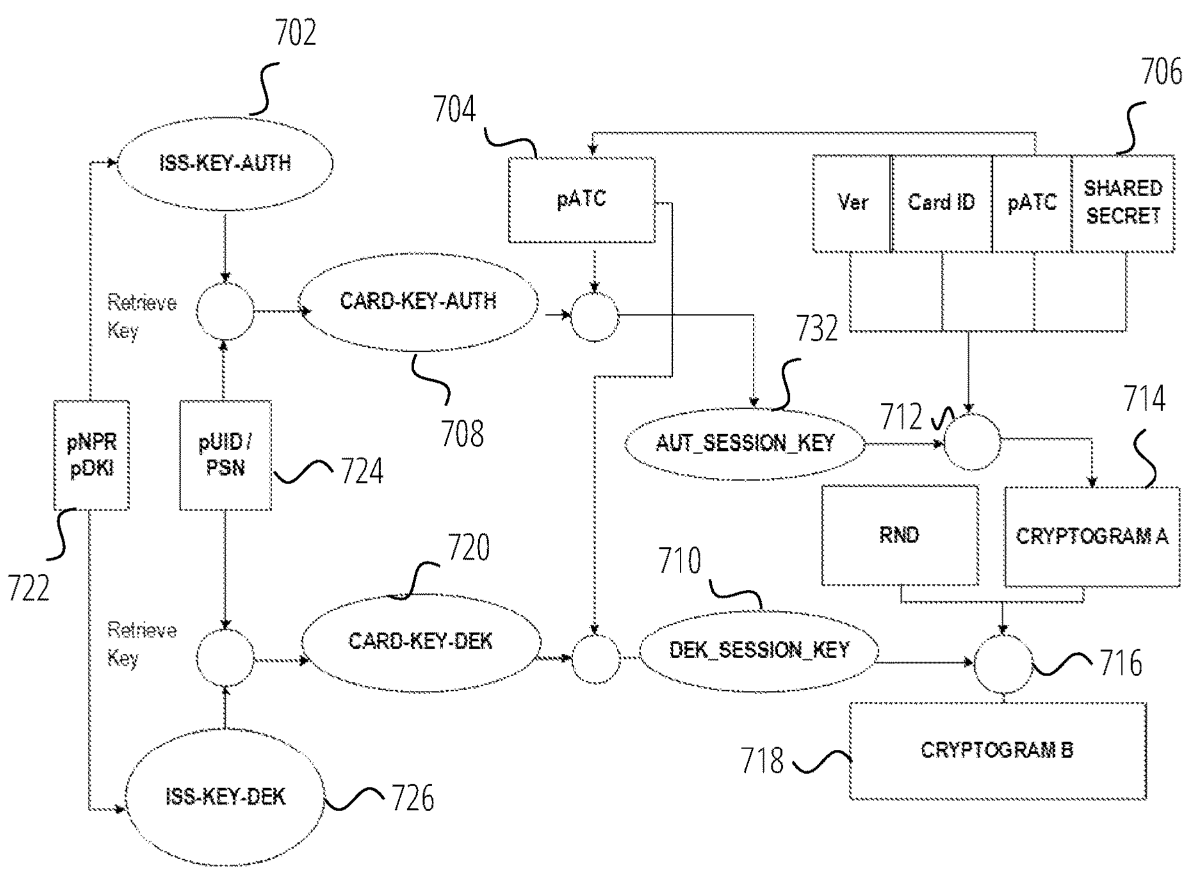

FIG. 7 illustrates a system 700 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. The 3DES algorithm may be used by EMV, and it is implemented by hardware in the contactless card. By using a key diversification process, one or more keys may be derived from a master key based upon uniquely identifiable information for each entity that requires a key.

Regarding master key management, two issuer master keys 702, 726 may be required for each part of the portfolio on which the one or more applets is issued. For example, the first master key 702 may comprise an Issuer Cryptogram Generation/Authentication Key (Iss-Key-Auth) and the second master key 726 may comprise an Issuer Data Encryption Key (Iss-Key-DEK). As further explained herein, two issuer master keys 702, 726 are diversified into card master keys 708, 720, which are unique for each card. In some examples, a network profile record ID (pNPR) 722 and derivation key index (pDKI) 724, as back office data, may be used to identify which Issuer Master Keys 702, 726 to use in the cryptographic processes for authentication. The system performing the authentication may be configured to retrieve values of pNPR 722 and pDKI 724 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 708 and Card-Key-Dek 720). The session keys (Aut-Session-Key 732 and DEK-Session-Key 710) may be generated by the one or more applets and derived by using the application transaction counter (pATC) 704 with one or more algorithms. To fit data into the one or more algorithms, only the 2 low order bytes of the 4-byte pATC 704 is used. In some examples, the four byte session key derivation method may comprise: F1:=PATC(lower 2 bytes)||'F0'||'00'||PATC (four bytes) F1:=PATC(lower 2 bytes)||'0F'||'00'||PATC (four bytes) SK:={(ALG (MK) [F1])||ALG (MK) [F2]}, where ALG may include 3DES Electronic Code Book (ECB) and MK may include the card unique derived master key.

As described herein, one or more MAC session keys may be derived using the lower two bytes of pATC 704. At each tap of the contactless card, pATC 704 is configured to be updated, and the card master keys Card-Key-AUTH 708 and Card-Key-DEK 720 are further diversified into the session keys Aut-Session-Key 732 and DEK-Session-KEY 710. pATC 704 may be initialized to zero at personalization or applet initialization time. In some examples, the pATC 704 may be initialized at or before personalization and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 732. The data specified in cryptogram may be processed with javacard.signature method: ALG_DES_MAC8_ISO9797_1_M2_ALG3 to correlate to EMV Authorization Request Cryptogram (ARQC) verification methods. The key used for this computation may comprise a session key AUT-Session-Key 732, as explained above. As explained above, the low order two bytes of the counter may be used to diversify for the one or more MAC session keys. As explained below, AUT-Session-Key 732 may be used to encrypt MAC data 706, and the resulting data or cryptogram A 714 and random number RND may be encrypted using DEK-Session-Key 710 to create cryptogram B or output 718 sent in the message.

In some examples, one or more hardware security module (HSM) commands may be processed for decrypting such that the final 16 (binary, 32 hex) bytes may comprise a 3DES symmetric encrypting using cipher block chaining (CBC) mode with a zero IV of the random number followed by MAC authentication data. The key used for this encryption may comprise a session key DEK-Session-Key 710 derived from the Card-Key-DEK 720. In this case, the application transaction counter (ATC) value for the session key derivation is the least significant byte of pATC 704.

The format below represents a binary version example embodiment. Further, in some examples, the first byte may be set to ASCII 'A'.

| Message Format | | | | |
|---|---|---|---|---|
| 1 | 2 | 4 | 8 | 8 |
| 0x43 (Message Type 'A') | Version | pATC | RND | Cryptogram A (MAC) |
| Cryptogram A (MAC) | 8 bytes | | | |
| MAC of | | | | |
| 2 | 8 | 4 | 4 | 18 bytes input data |
| Version | pUID | pATC | Shared Secret | |

| Message Format | | | | |
|---|---|---|---|---|
| 1 | 2 | 4 | | 16 |
| 0x43 (Message Type 'A') | Version | pATC | | Cryptogram B |
| Cryptogram A (MAC) | 8 bytes | | | |
| MAC of | | | | |
| 2 | 8 | 4 | 4 | 18 bytes input data |
| Version | pUID | pATC | Shared Secret | |
| Cryptogram B | 16 | | | |
| Sym Encryption of | | | | |
| 8 | 8 | | | |
| RND | Cryptogram A | | | |

Another exemplary format is shown below. In this example, the tag may be encoded in hexadecimal format.

| Message Format | | | | | |
|---|---|---|---|---|---|
| 2 | 8 | 4 | | 8 | 8 |
| Version | pUID | pATC | | RND | Cryptogram A (MAC) |
| 8 bytes | | | | | |
| 8 | 8 | 4 | 4 | | 18 bytes input data |
| pUID | pUID | pATC | Shared Secret | | |

| Message Format | | | | |
|---|---|---|---|---|
| 2 | 8 | 4 | | 16 |
| Version | pUID | pATC | | Cryptogram B |
| 8 bytes | | | | |
| 8 | | 4 | 4 | 18 bytes input data |
| pUID | pUID | pATC | Shared Secret | |
| Cryptogram B | 16 | | | |
| Sym Encryption of | | | | |
| 8 | 8 | | | |
| RND | Cryptogram A | | | |

The unique identifier (UID) field of the received message may be extracted to derive, from master keys Iss-Key-AUTH 702 and Iss-Key-DEK 726, the card master keys (Card-Key-Auth 708 and Card-Key-DEK 720) for that particular card. Using the card master keys (Card-Key-Auth 708 and Card-Key-DEK 720), the counter (pATC) field of the received message may be used to derive the session keys (Aut-Session-Key 732 and DEK-Session-Key 710) for that particular card. Cryptogram B 718 may be decrypted using the DEK-Session-KEY, which yields cryptogram A 714 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 714, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 732. The input data 706 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 712, data 706 is processed through the MAC using Aut-Session-Key 732 to produce MAC output (cryptogram A) 714, which is encrypted.

In order to provide additional protection against brute force attacks exposing the keys on the card, it is desirable that cryptogram A 714 be enciphered. In some examples, data or cryptogram A 714 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 710. In the encryption operation 716, data or cryptogram A 714 and RND are processed using DEK-Session-Key 710 to produce encrypted data, cryptogram B 718. Cryptogram A 714 may be enciphered using 3DES in CBC mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

Figure 8:
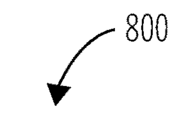
FIG. 8 illustrates an example of a method of generating a cryptogram in accordance with one embodiment.
Figure 8:
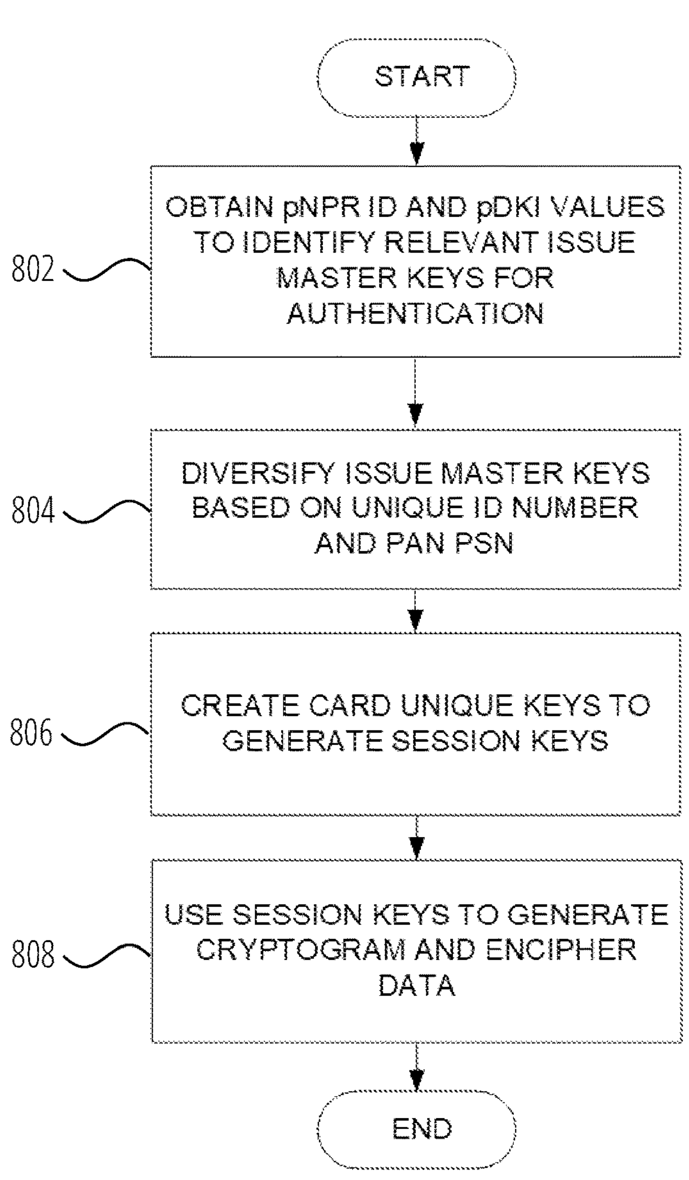

FIG. 8 illustrates a method 800 for generating a cryptogram. For example, at block 802, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 804, Issuer Master Keys may be diversified by combining them with the card's unique ID number (pUID) and the PAN sequence number (PSN) of one or more applets, for example, a payment applet.

At block 806, Card-Key-Auth and Card-Key-DEK (unique card keys) may be created by diversifying the Issuer Master Keys to generate session keys which may be used to generate a MAC cryptogram.

At block 808, the keys used to generate the cryptogram and encipher the data in the one or more applets may comprise the session keys of block 806 based on the card unique keys (Card-Key-Auth and Card-Key-DEK). In some examples, these session keys may be generated by the one or more applets and derived by using pATC, resulting in session keys Aut-Session-Key and DEK-Session-Key.

Figure 9:
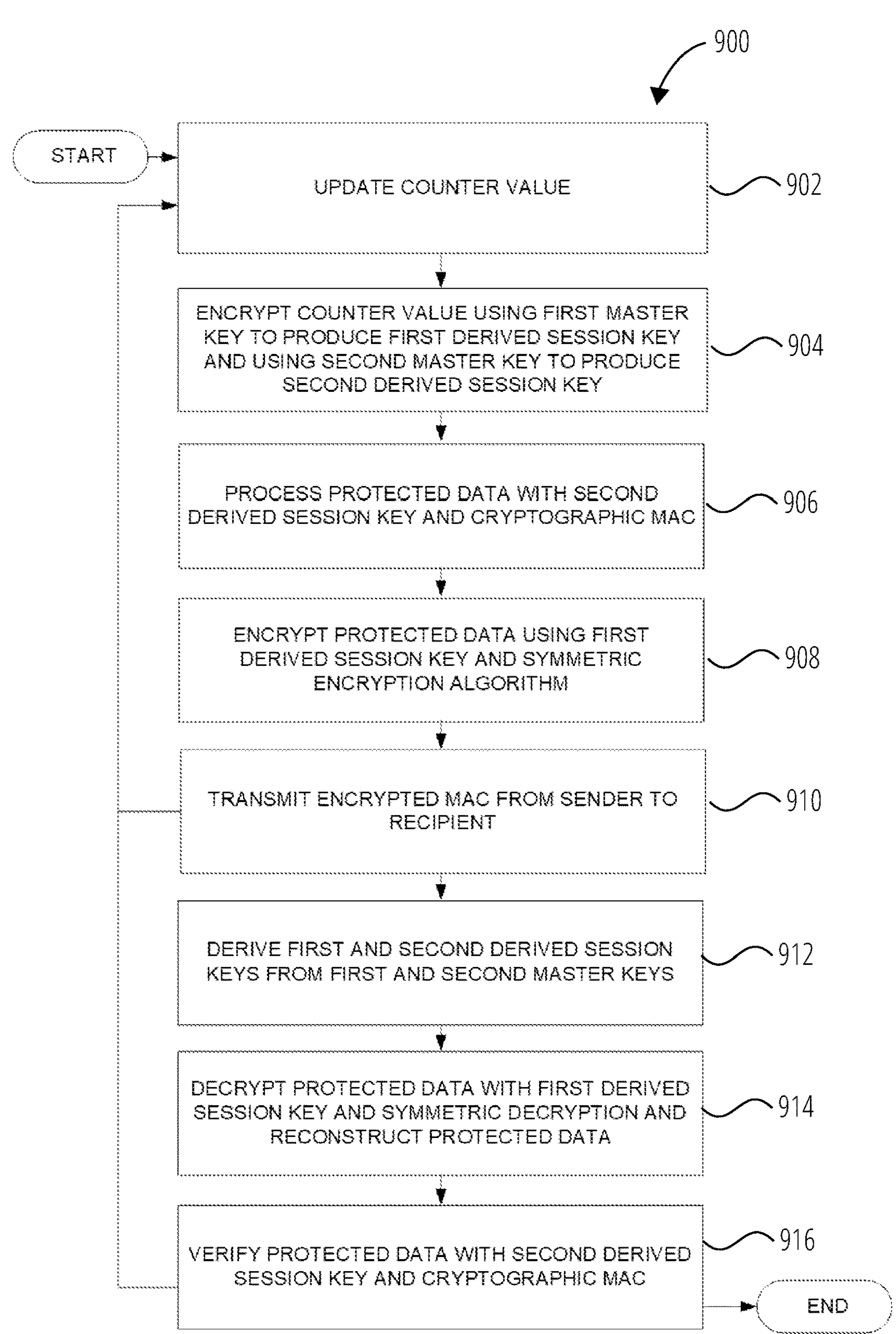
FIG. 9 illustrates an example of a method of key diversification in accordance with one embodiment.

FIG. 9 depicts an exemplary process 900 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 902, and other data, such as data to be protected, which it may secure share with the recipient.

At block 904, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 906, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 908, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 910, the encrypted MAC is transmitted, from the sender to the recipient, with sufficient information to identify additional secret information (such as shared secret, master keys, etc.), for verification of the cryptogram.

At block 912, the recipient uses the received counter value to independently derive the two derived session keys from the two master keys as explained above.

At block 914, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 916, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and the recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 902) and a new set of session keys may be created (at block 910). In some examples, the combined random data may be discarded.

Figure 10:
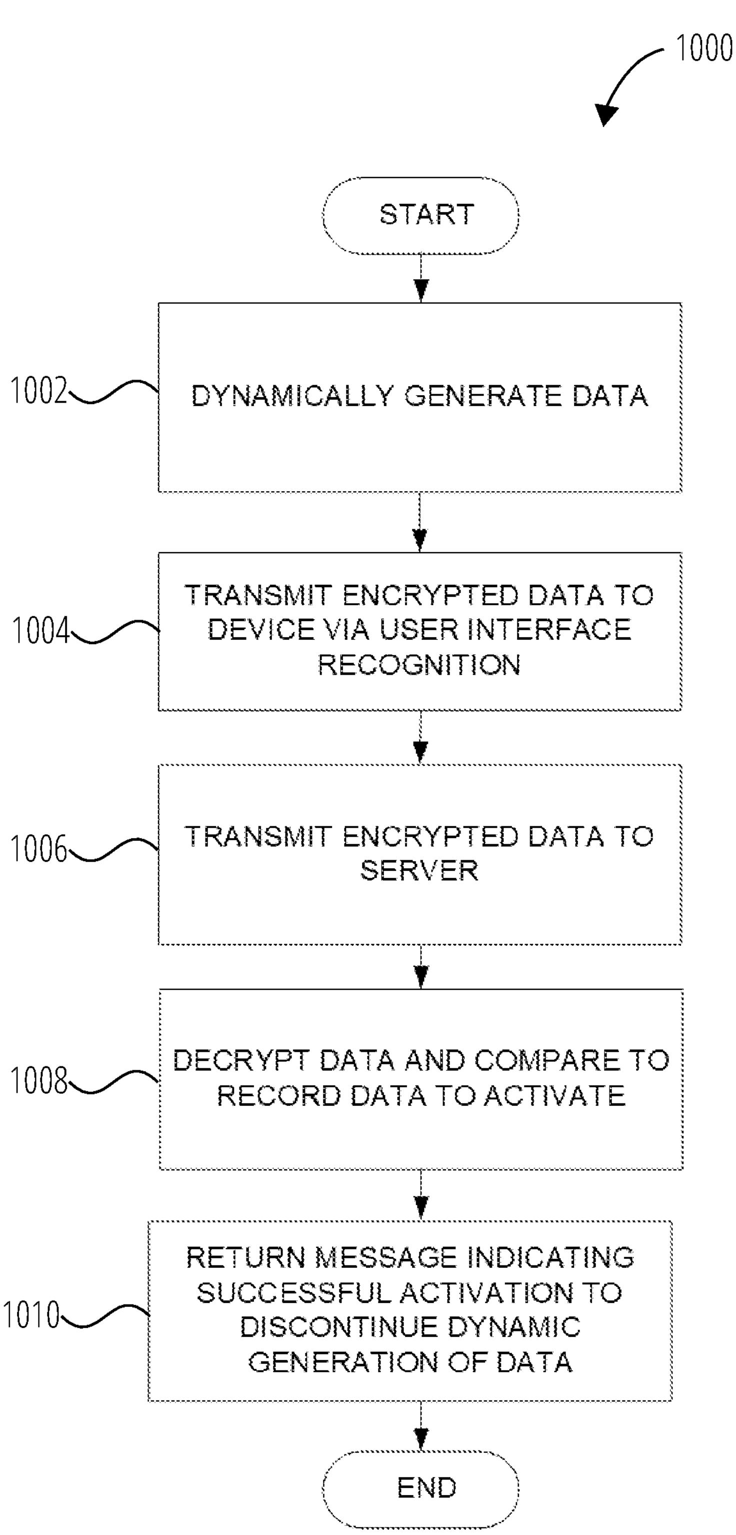
FIG. 10 illustrates an example of a method of card activation in accordance with one embodiment.

FIG. 10 illustrates a method 800 for card activation according to an example embodiment. For example, card activation may be completed by a system including a card, a device, and one or more servers. The contactless card, device, and one or more servers may reference same or similar components that were previously explained, such as a contactless card 102, a client device 104, and a server.

In block 1002, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

In block 1004, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 1006, the one or more portions of the data may be communicated to one or more servers, such as a card issuer server. For example, one or more encrypted portions of the data may be transmitted from the device to the card issuer server for activation of the card.

In block 1008, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 1010, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

FIGS. 1-10 are generally directed to systems and methods to authenticate a contactless card based on information on the contactless card. However, as previously discussed, some embodiments disclosed herein can include systems and methods for digital enrollment responsive to satisfying predetermined conditions. For example, when a customer receives the contactless card in the mail or otherwise, the customer can use a mobile device to digitally enroll the contactless card with a mobile application associated with a bank or a company that issued the contactless card for digitally accessing the customer account via the mobile application. The predetermined conditions that can be satisfied prior to digitally enrolling the contactless card with the mobile application can include confirmation that the customer is in possession of both the contactless card and the mobile device. FIGS. 11-14 are generally directed to these embodiments and provide additional details thereof.

Figure 11:
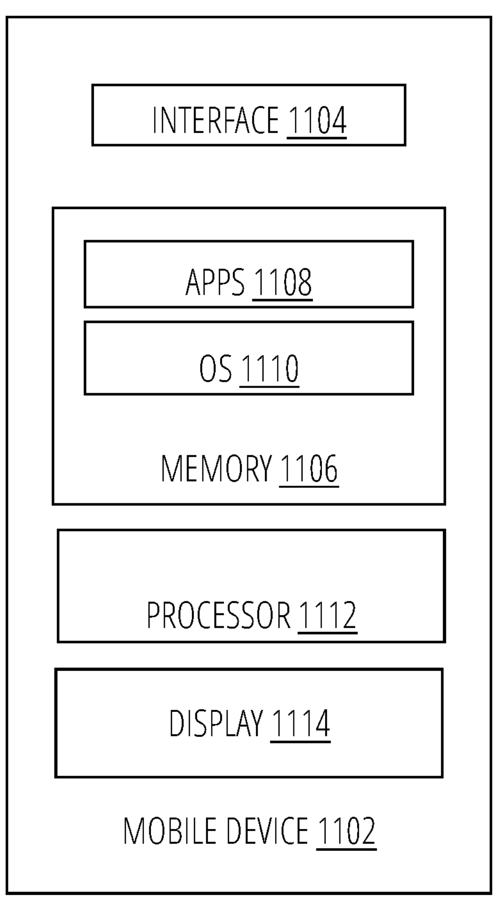
FIG. 11 illustrates an example of a mobile device in accordance with one embodiment.

FIG. 11 is a block diagram that illustrates an example of a mobile device 1102 in accordance with disclosed embodiments. It is to be understood that the mobile device 1102 can be the same as or similar to the client device 104.

As seen, the mobile device 1102 can include an interface, 1104, a memory 1106, a processor 1112, and a display device 1114. The memory 1106 can be configured to store computer instructions configured to execute on the processor 1112, and the computer instructions can be part of applications 1108 and/or an operating system 1110. However, embodiments are not limited in this manner.

In some embodiments, the interface 1104 can include one or more antennas, such as a short-range communication antenna, and/or a wireless card reader, such as a camera, a scanner, or another device capable of reading information or data within its field of view. Additionally or alternatively, the interface 1104 can include a Wi-Fi interface, a Bluetooth interface, an NFC interface, a serial bus interface, a universal serial bus (USB), and so forth.

In some embodiments, the memory 1106 can be any type of memory configured to store instructions to be processed by the processor 1112. Examples of the memory 1106 can include volatile or non-volatile memory, removable or non-removable memory, erasable or non-erasable memory, writeable or re-writeable memory, and so forth.

In some embodiments, the processor 1112 can be any type of processor, microprocessor, circuit, circuit element (e.g., transistor, resistor, capacitor, inductor, and so forth), integrated circuit, application specific integrated circuit (ASIC), programmable logic device (PLD), digital signal processor (DSP), field programmable gate array (FPGA), multi-core processor, and so forth.

In some embodiments, the display device 1114 can include a display screen or other output device for displaying data, information, and/or graphics to a user of the mobile device 1102.

As explained above, the memory 1106 can include the applications 1108 and/or the operating system 1110. The applications 1108 can include any type of application configured to operate on the mobile device 1102. For example, the applications 1108 can include social networking applications, communication applications, business productivity applications (e.g., email, word processor, spreadsheet, etc.), storefront applications, money transfer applications, gaming applications, merchant applications, shopping mobile applications, and so forth. Of particular relevance to some embodiments disclosed herein, the applications 1108 can include mobile banking applications and/or mobile credit card applications.

The applications 1108 can be configured to operate within the operating system 1110. In some embodiments, the operating system 1110 can be an Android® operating system, Apple iOS® operating system, Windows Mobile Operating System®, and so forth. The operating system 1110 can be configured to provide services and instructions that execute and enable the applications 1108 to operate with hardware. For example, the operating system 1110 can be configured to operate with the hardware associated with the processor 1112 to process detections made by the interface 1104. In some embodiments, the operating system 1110 can provide data to the applications 1108 processed by the operating system 1110. The applications 1108 can process such data, including performing authentications of the data, communicating the data to other devices or servers, and so forth. In some embodiments, at least a portion of the operating system 1110 can be configured to perform one or more identifying, verification, and/or authentication steps.

Figure 12:
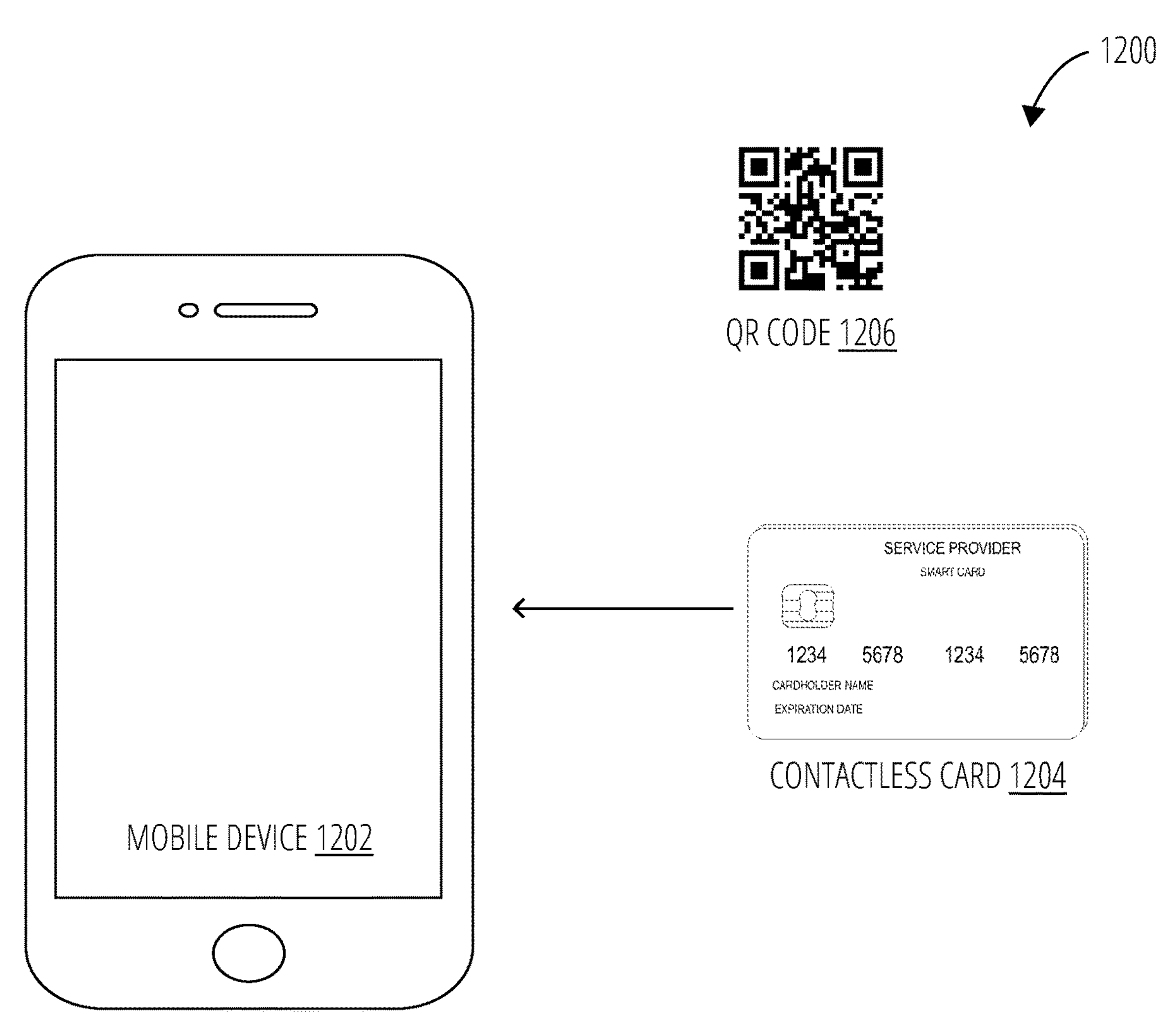
FIG. 12 illustrates an example of a system in accordance with one embodiment.

FIG. 12 is a block diagram that illustrates an example of a system 1200 in accordance with disclosed embodiments. As seen, the system 1200 can include a mobile device 1202 and a contactless card 1204. It is to be understood that the mobile device 1202 can be the same as or similar to the mobile device 1102 and/or the client device 104. It is also to be understood that the contactless card 1204 can be the same as or similar to the contactless card 102. The contactless card 1204 can be associated with a customer account of a bank or a company that issued the contactless card 1204, and a phone number of the mobile device 1202 can also be associated with the customer account.

In some embodiments, a user can bring a code 1206 (e.g., a two-dimensional data code, such as a Quick Response code ("QR code®": a registered trademark of Denso Wave Incorporated)) on the contactless card 1204 or a paper associated with the contactless card 1204 into a scanning or reading range of the mobile the device 1202. The code 1206 can include a network address embedded therein, and the mobile device 1202 can scan or read the code 1206 to receive the network address. Responsive to receiving the network address from the contactless card 1204, a mobile application executing on the mobile device 1202 can access a web page at the network address and display a solicitation for communication with the contactless card 1204. The user can then tap or otherwise bring the contactless card 1204 within a communication range of the mobile device 1202, and the mobile device 1202 can read a cryptogram from the contactless card 1204 and/or the contactless card 1204 can transmit the cryptogram to the mobile device 1202.

In operation, the mobile device 1202 can authenticate the contactless card 1204, use the cryptogram to identify the customer account associated with the contactless card 1204, and verify that the phone number of the mobile device 1202 is associated with the customer account. For example, in some embodiments, the mobile device 1202 can successfully decrypt the cryptogram to identify the customer account associated with the contactless card 1204. In particular, in some embodiments, the mobile device 1202 can decrypt protected data in the cryptogram, compare the protected data to stored record data associated with the contactless card 1204, and identify the customer account based on a match between the protected data and the stored record data. In some embodiments, the mobile device 1202 can transmit the cryptogram and/or the phone number of the mobile device 1202 to a server to identify the customer account associated with the contactless card 1204, as discussed in FIGS. 1-10, and/or to verify that the phone number of the mobile device 1202 is associated with the customer account. Furthermore, in some embodiments, the mobile device 1202 and/or the server can call or otherwise contact or connect with a mobile network operator to identify the phone number of the mobile device 1202. For example, the mobile device 1202 and/or the server can contact the mobile network operator on a back end to solicit the phone number associated with the mobile device 1202, thereby executing a silent mobile authentication.

It is to be understood that, in some embodiments, the customer account associated with the contactless card 1204 will not be identified unless the phone number of the mobile device 1202 is associated with the customer account. Additionally or alternatively, it is to be understood that, in some embodiments, the phone number of the mobile device 1202 will not be verified as being associated with the customer account unless the customer account is associated with the contactless card 1204. In this regard, without these conditions being satisfied, the mobile device 1202 and/or the server may not be capable of decrypting the cryptogram and/or the protected data in the cryptogram, for example, due to lacking required keys and the like. Additionally or alternatively, without these conditions being satisfied, the mobile device 1202 and/or the server may be able to decrypt the cryptogram and/or the protected data in the cryptogram, but may not be able to match the protected data to any record data stored for registered cards. In this regard, the contactless card 1204 can be associated with the customer account and the customer account can be associated with the mobile device 1202 and/or the phone number of the mobile device 1202 in a database or data store maintained by the server. As such, the mobile device 1202 can provide the cryptogram received from the contactless card 1204 as well identifying data, such as identifiers of the mobile device and/or the phone number of the mobile device, to the server, and the server can utilize such received information to identify the customer account and verify that the customer account is associated with the mobile device 1202 and/or the phone number of the mobile device.

When the phone number of the mobile device has been verified as being associated with the customer account, the mobile device 1202 can receive user input for accessing the customer account, including a user name and/or a password for the customer account. Then, the mobile device 1202 can enroll the contactless card 1204 with the mobile application for digitally accessing the customer account via the mobile application.

Figure 13:
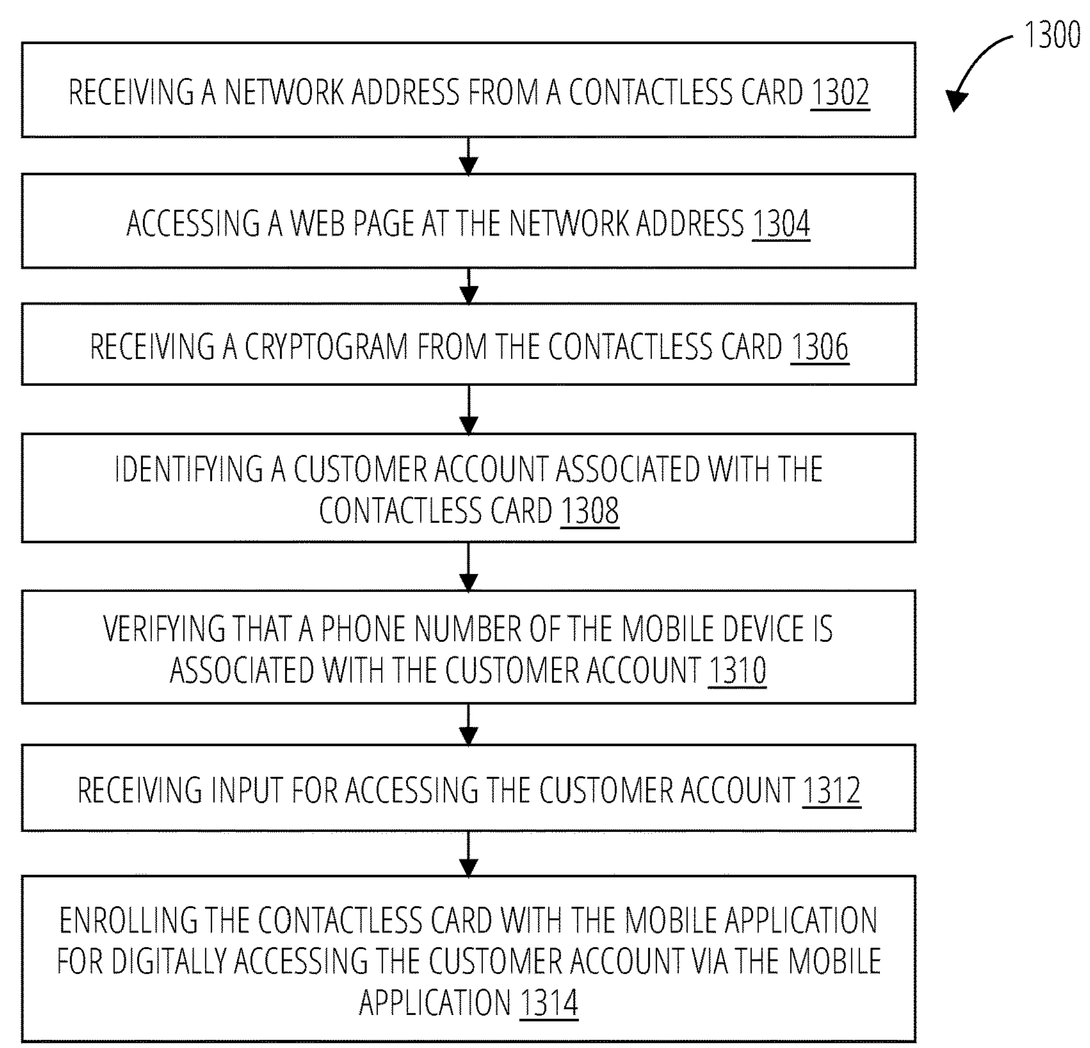
FIG. 13 illustrates an example of a method in accordance with one embodiment.

FIG. 13 is a flow chart that illustrates an example of a method 1300 in accordance with disclosed embodiments. In some embodiments, a mobile device can execute some or all of the method 1300. Additionally or alternatively, in some embodiments, a server in communication with the mobile device can execute some or all of the method 1300.

As seen, the method 1300 can include receiving a network address from a contactless card as in 1302. For example, in some embodiments, a wireless card reader of the mobile device can scan a two-dimensional data code, such as a Quick Response code (e.g., a QR code®) or a sticker on the contactless card or a paper associated with the contactless card to receive the network address when the two-dimensional data code or the sticker is within a field of view of the wireless card reader.

After receiving the network address, the method 1300 can include accessing a web page at the network address as in 1304. For example, in some embodiments, a web browser or a mobile application executing on the mobile device can access the web page at the network address.

Then, the method 1300 can include receiving a cryptogram from the contactless card as in 1306. For example, in some embodiments, a short-range communication antenna of the mobile device can receive the cryptogram from the contactless card. In some embodiments, the mobile device can receive the cryptogram responsive to a solicitation for communication with the contactless card displayed on a display device of the mobile device. For example, in some embodiments, the mobile device can display the solicitation for the communication responsive to accessing the web page at the network address.

After receiving the cryptogram as in 1306, the method 1300 can include identifying a customer account associated with the contactless card as in 1308 and verifying that a phone number of the mobile device is associated with the customer account as in 1310. In some embodiments, a processor of the mobile device and/or a server in communication with the mobile device can identify the customer account associated with the contactless card and/or verify that the phone number of the mobile device is associated with the customer account. In some embodiments, the processor of the mobile device and/or the server can successfully decrypt the cryptogram to identify the customer account associated with the contactless card. For example, the processor of the mobile device and/or the server can decrypt protected data in the cryptogram, compare the protected data to record data associated with the contactless card and stored on the mobile device and/or the server, and identify the customer account based on a match between the protected data and the record data. In some embodiments, the mobile device and/or the server can call or otherwise contact or connect with a mobile network operator to identify the phone number of the mobile device. In embodiments in which the server identifies the customer account associated with the contactless card and/or verifies that the phone number of the mobile device is associated with the customer account, the mobile device can transmit the cryptogram to the server and receive an indication that the phone number of the mobile device is associated with the customer account. For example, the mobile device can transmit a message to the mobile device that includes the cryptogram and/or the phone number of the mobile device.

When the phone number of the mobile device has been verified as being associated with the customer account as in 1310, the method 1300 can include receiving user input for accessing the customer account as in 1312. In some embodiments, the display device of the mobile device can display a user name for the customer account and a solicitation for a password for the customer account to create or log into the customer account.

Finally, the method 1300 can include enrolling the contactless card with the mobile application for digitally accessing the customer account via the mobile application as in 1314. For example, the mobile application, the processor of the mobile device, and/or the server can provide access to the customer account via the mobile application.

Figure 14:
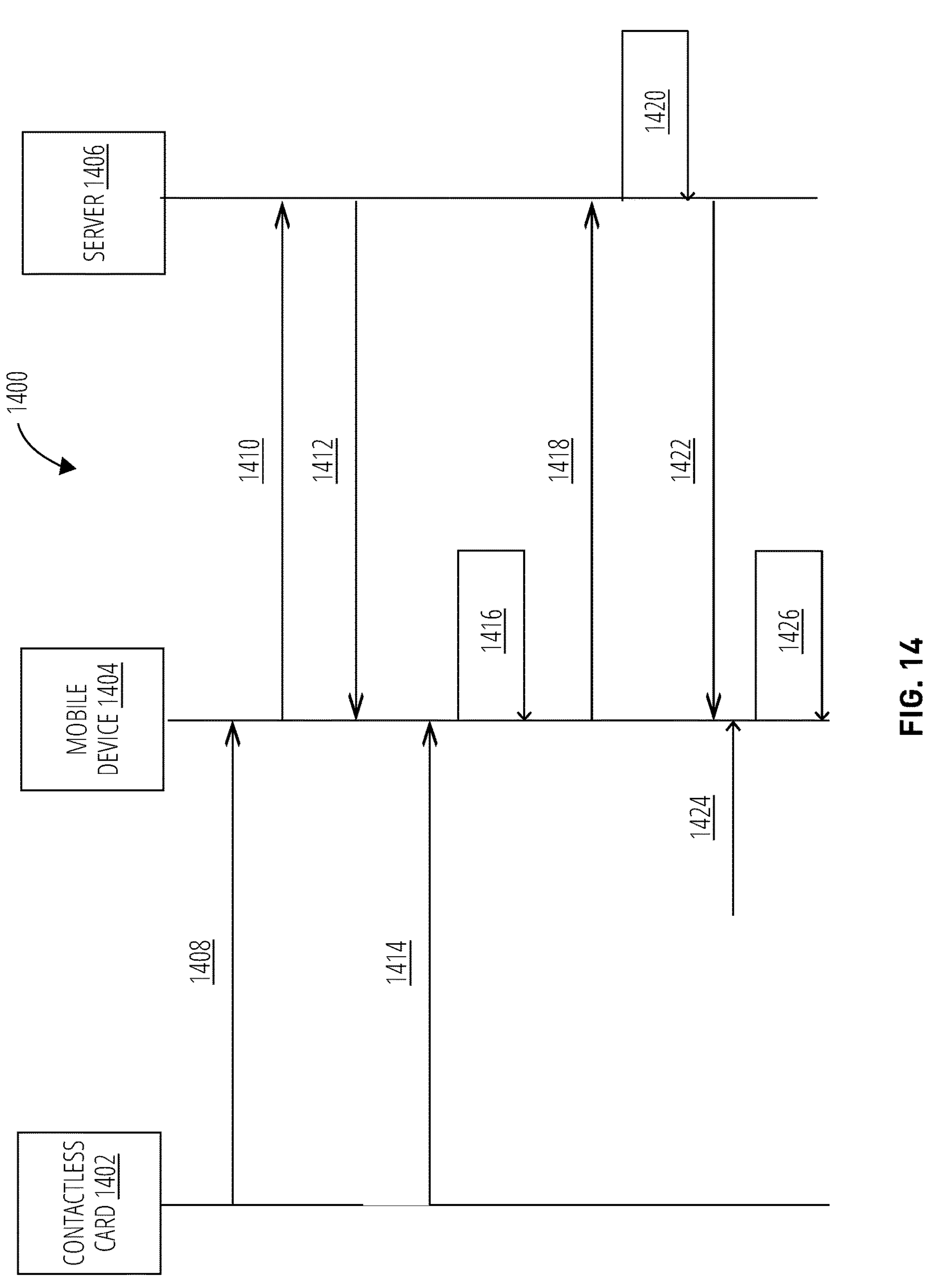
FIG. 14 illustrates an example of a sequence flow in accordance with one embodiment.

FIG. 14 illustrates an example of a sequence flow 1400 in accordance with disclosed embodiments. In some embodiments, identification, verification, and/or authentication can be performed by a mobile device 1404. Additionally or alternatively, in some embodiments, identification, verification, and/or authentication can be performed by a server 1406.

At 1408, a two-dimensional data code, such as a Quick Response code (e.g., a QR code®) or a sticker on a contactless card 1402 can be brought within a scanning or reading range of the mobile device 1404, and the mobile device can scan or read the two-dimensional data code or the sticker. Line 1408 can represent communication between the contactless card 1402 and the mobile device 1404 and can include a network address.

At 1410 and 1412, the mobile device 1404 can communicate with the server 1406 to access a web page at the network address. Line 1410 can represent communication from the mobile device 1404 to the server 1406, and line 1412 can represent communication from the server 1406 to the mobile device 1404. For example, at 1410, the mobile device 1404 can transmit the network address to the server 1406, and at 1412, the server 1406 can transmit content for the web page at the network address to the mobile device 1404.

At 1414, a contactless card 1402 can be tapped on or brought within a communication range of the mobile device 1404 and can exchange information with the mobile device 1404. Line 1414 can represent communication between the contactless card 1402 and the mobile device 1404 and can include a cryptogram stored on the contactless card 1402 and provided to the mobile device 1404. In some embodiments, protected data in the cryptogram can be encrypted using systems and methods described herein, for example, as discussed in FIGS. 1-10.

In some embodiments, communications between the contactless card 1402 and the mobile device 1404 can include NFC communications in accordance with one or more NFC protocols. However, embodiments disclosed herein are not so limited and can include other wireless technologies in addition to NFC or as an alternative to NFC, such as other short-range communication protocols.

At 1416, the mobile device 1404 can process the cryptogram received from the contactless card 1402. For example, in some embodiments, based on the cryptogram received from the contactless card 1402, the mobile device 1404 can identify a customer account associated with the contactless card 1402. Additionally or alternatively, in some embodiments, the mobile device 1404 can verify that a phone number of the mobile device 1404 is associated with the customer account. Additionally or alternatively, the mobile device 1404 can operate as a pass-through and transmit the authentication data and/or the cryptogram to the server 1406 for identification, verification, and/or authentication.

At 1418, the mobile device 1404 can transmit information to the server 1406. Line 1418 can represent communication between the mobile device 1404 and the server 1406. For example, in some embodiments, the mobile device 1404 can transmit the cryptogram received from the contactless card 1402, as received, to the server 1406. However, in some embodiments, the mobile device 1404 can process the cryptogram received from the contactless card 1402, either partially or fully, and transmit the cryptogram to the server 1406 as processed, for example, protected data or keys either partially or fully decrypted. Additionally or alternatively, in some embodiments, the mobile device 1404 can transmit an information request to the server 1406 soliciting data stored on the server, such as record data, for comparison to the protected data in the cryptogram received from the contactless card 1402. Additionally or alternatively, in some embodiments, the information request transmitted from the mobile device 1404 to the server 1406 can solicit an identification of the customer account associated with the contactless card 1402 and/or data associated therewith. In some embodiments, the mobile device 1404 can store the record data thereon for comparison to the protected data and/or can store the identification of the customer account and/or the data associated therewith for comparison with data associated with the mobile device 1404, including the phone number of the mobile device 1404.

The mobile device 1404 can transmit the information to the server 1406 via one or more wireless and/or wired connections. For example, in some embodiments, the mobile device 1404 can transmit the information to one or more application program interfaces (APIs) hosted by the server 1406. Additionally or alternatively, in some embodiments, the mobile device 1404 can transmit the information to one or more APIs hosted by a third party, such as a cloud-computing provider.

At 1420, the server 1406 can process the information received from the mobile device 1404. For example, in some embodiments, the server 1406 can identify the customer account associated with the contactless card 1402 and/or identify and verify that the phone number of the mobile device 1404 is associated with the customer account. In this regard, the server 1406 can process the information received from the mobile device 1404, either partially or fully. Additionally or alternatively, in some embodiments, the server 1406 can compare the protected data with the record data stored on the server 1406 and/or can compare the data associated with the customer account with the data associated with the mobile device 1404, including the phone number of the mobile device 1404.

At 1422, the server 1406 can transmit information to the mobile device 1404. Line 1422 can represent communication between the server 1406 and the mobile device 1404. For example, the server 1406 can transmit an indication that the phone number of the mobile device 1404 is associated with the customer account, can transmit an identification of the customer account, can transmit the data associated with the customer account, can transmit the protected data or other data that the server 1406 decrypted from the cryptogram, can transmit the record data stored on the server 1406, and/or can transmit an indication of results from comparing the protected data with the record data.

At 1424, upon verifying that phone number of the mobile device 1404 is associated with the customer account, the mobile device 1404 can receive user input for accessing the customer account. Line 1424 can represent communication from a user to the mobile device 1404. For example, the user input can be entered into a display device of the mobile device 1404.

Finally, at 1426, the mobile device 1404 can enroll the contactless card 1402 with a mobile application for digitally accessing the customer account via the mobile application. In some embodiments, such enrollment can include communication with the server 1406 as described herein.

Figure 15:
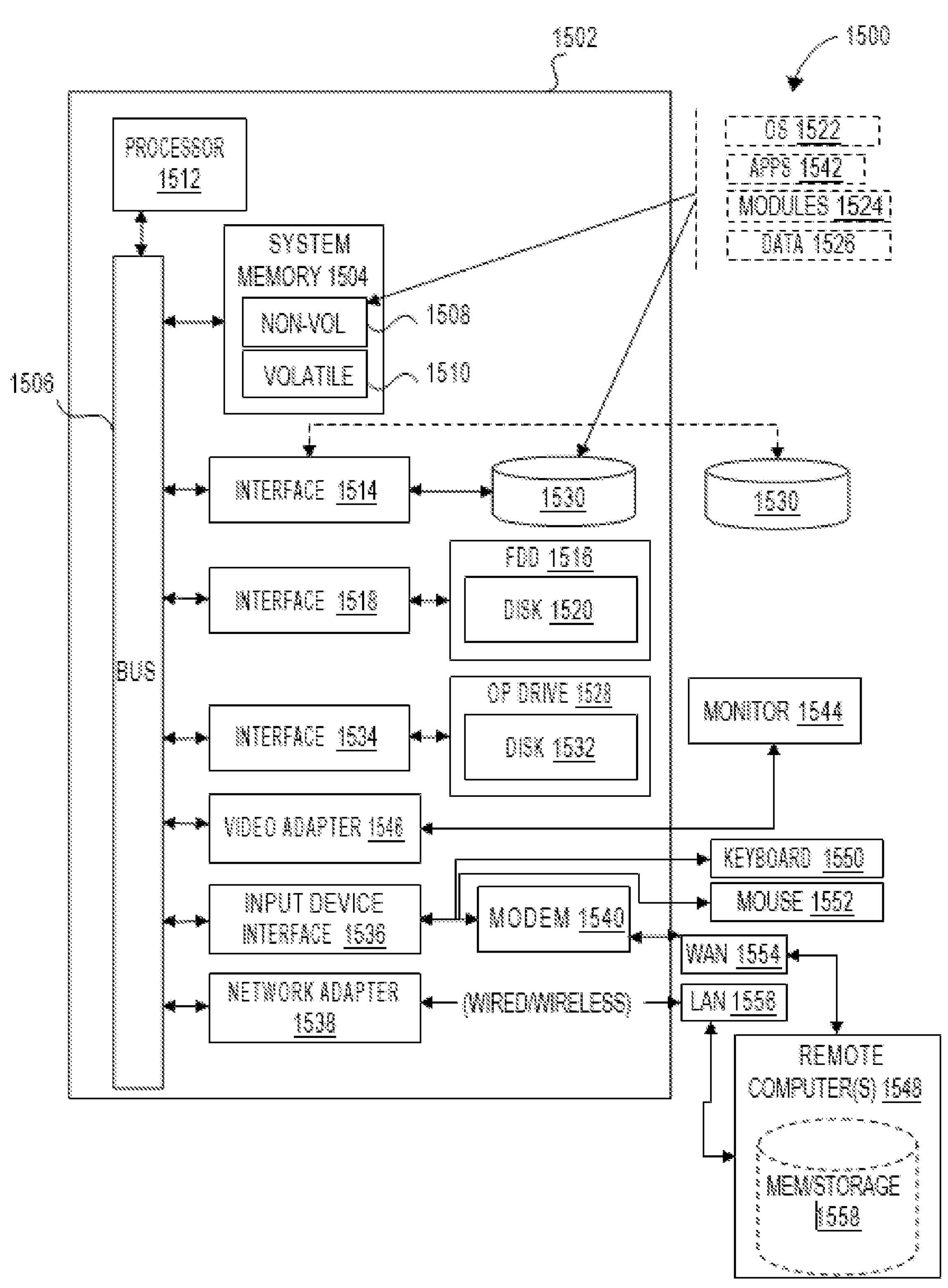
FIG. 15 illustrates an example of a computer architecture in accordance with one embodiment.

FIG. 15 illustrates an embodiment of an exemplary computer architecture 1500 suitable for implementing various embodiments as previously described. In one embodiment, the computer architecture 1500 may include or be implemented as part of one or more systems or devices discussed herein.

As used in this application, the terms "system" and "component" are intended to refer to a computer-related entity, either hardware, a combination of hardware and software, software, or software in execution, examples of which are provided by the exemplary computing computer architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1500.

As shown in FIG. 15, the computing architecture 1500 includes a processor 1512, a system memory 1504 and a system bus 1506. The processor 1512 can be any of various commercially available processors.

The system bus 1506 provides an interface for system components including, but not limited to, the system memory 1504 to the processor 1512. The system bus 1506 can be any of several types of bus structure that may further interconnect to a memory bus (with or without a memory controller), a peripheral bus, and a local bus using any of a variety of commercially available bus architectures. Interface adapters may connect to the system bus 1506 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), Peripheral Component Interconnect (PCI) Express, Personal Computer Memory Card International Association (PCMCIA), and the like.

The computing architecture 1500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1504 may include various types of computer-readable storage media in the form of one or more higher speed memory units, such as ROM, RAM, dynamic RAM (DRAM), Double-Data-Rate DRAM (DDRAM), synchronous DRAM (SDRAM), static RAM (SRAM), programmable ROM (PROM), erasable programmable ROM (EPROM), EEPROM, flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1504 can include non-volatile 1508 and/or volatile 1510. A basic input/output system (BIOS) can be stored in the non-volatile 1508.

A computer 1502 may include various types of computer-readable storage media in the form of one or more lower speed memory units, including an internal (or external) hard disk drive 1530, a magnetic disk drive 1516 to read from or write to a removable magnetic disk 1520, and an optical disk drive 1528 to read from or write to a removable optical disk 1532 (e.g., a CD-ROM or DVD). The hard disk drive 1530, magnetic disk drive 1516 and optical disk drive 1528 can be connected to system bus 1506 by a hard disk drive (HDD) interface 1514, a floppy disk drive (FDD) interface 1518, and an optical disk drive interface 1534, respectively. The HDD interface 1514 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1508, and volatile 1510, including an operating system 1522, one or more applications 1542, other program modules 1524, and program data 1526. In one embodiment, the one or more applications 1542, other program modules 1524, and program data 1526 can include, for example, the various applications and/or components of the systems discussed herein.

A user can enter commands and information into the computer 1502 through one or more wire/wireless input devices, for example, a keyboard 1550 and a pointing device, such as a mouse 1552. Other input devices may include microphones, infra-red (IR) remote controls, radio frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processor 1512 through an input device interface 1536 that is coupled to the system bus 1506 but can be connected by other interfaces such as a parallel port, IEEE 1394 serial port, a game port, a USB port, an IR interface, and so forth.

A monitor 1544 or other type of display device is also connected to the system bus 1506 via an interface, such as a video adapter 1546. The monitor 1544 may be internal or external to the computer 1502. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all the elements described relative to the computer 1502, although, for purposes of brevity, only a memory and/or storage device 1558 is illustrated. The logical connections depicted include wire/wireless connectivity to a LAN 1556 and/or larger networks, for example, a WAN 1554. Such LAN and WAN networking environments are commonplace in offices and companies, and facilitate enterprise-wide computer networks, such as intranets, all of which may connect to a global communications network, for example, the Internet.

When used in a LAN 1556 networking environment, the computer 1502 is connected to the LAN 1556 through a wire and/or wireless communication network interface or network adapter 1538. The network adapter 1538 can facilitate wire and/or wireless communications to the LAN 1556, which may also include a wireless access point disposed thereon for communicating with the wireless functionality of the network adapter 1538.

When used in a WAN 1554 networking environment, the computer 1502 can include a modem 1540, or is connected to a communications server on the WAN 1554 or has other means for establishing communications over the WAN 1554, such as by way of the Internet. The modem 1540, which can be internal or external and a wire and/or wireless device, connects to the system bus 1506 via the input device interface 1536. In a networked environment, program modules depicted relative to the computer 1502, or portions thereof, can be stored in the remote memory and/or storage device 1558. It will be appreciated that the network connections shown are exemplary and other means of establishing a communications link between the computers can be used.

The computer 1502 can be operable to communicate with wired and wireless devices or entities using the IEEE 802 family of standards, such as wireless devices operatively disposed in wireless communication (e.g., IEEE 802.11 over-the-air modulation techniques). This includes at least Wi-Fi, WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, ASICs, PLDs, DSPs, field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, ASICs, logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 16:
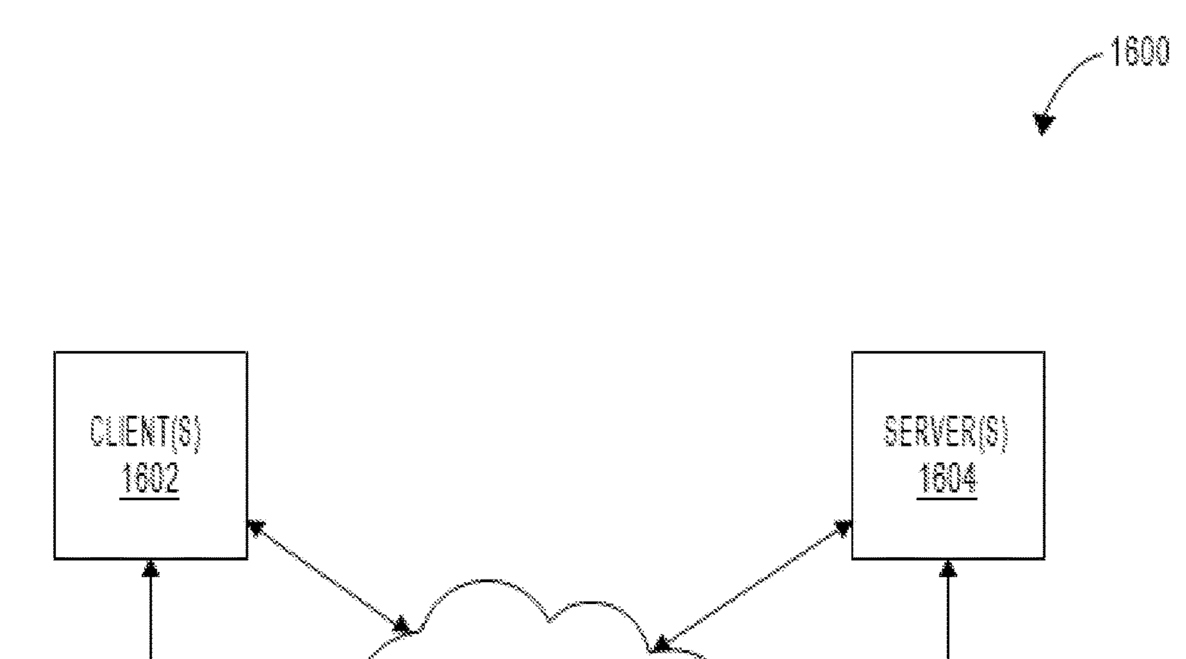
FIG. 16 illustrates an example of a communications architecture in accordance with one embodiment.

FIG. 16 is a block diagram depicting an exemplary communications architecture 1600 suitable for implementing various embodiments as previously described. The communications architecture 1600 includes various common communications elements, such as a transmitter, receiver, transceiver, radio, network interface, baseband processor, antenna, amplifiers, filters, power supplies, and so forth. The embodiments, however, are not limited to implementation by the communications architecture 1600, which may be consistent with systems and devices discussed herein.

As shown in FIG. 16, the communications architecture 1600 includes one or more client(s) 1602 and server(s) 1604. The server(s) 1604 may implement one or more functions and embodiments discussed herein. The client(s) 1602 and the server(s) 1604 are operatively connected to one or more respective client data store 1606 and server data store 1608 that can be employed to store information local to the respective client(s) 1602 and server(s) 1604, such as cookies and/or associated contextual information.

The client(s) 1602 and the server(s) 1604 may communicate information between each other using a communication framework 1610. The communication framework 1610 may implement any well-known communications techniques and protocols. The communication framework 1610 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1610 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by client(s) 1602 and the server(s) 1604. A communications network may be any one and the combination of wired and/or wireless networks including without limitation a direct interconnection, a secured custom connection, a private network (e.g., an enterprise intranet), a public network (e.g., the Internet), a PAN, a LAN, a Metropolitan Area Network (MAN), an Operating Missions as Nodes on the Internet (OMNI), a WAN, a wireless network, a cellular network, and other communications networks.

What is claimed is:

1. A method comprising:

scanning, via a wireless card reader of a mobile device, a two-dimensional data code or a sticker on a contactless card or a paper associated with the contactless card;

responsive to scanning the two-dimensional data code or the sticker, receiving, by the wireless card reader of the mobile device, a network address from the contactless card;

accessing, via a mobile application executing on the mobile device, a web page at the network address;

receiving, by a short-range communication antenna of the mobile device, a cryptogram from the contactless card;

identifying, by a processor of the mobile device and based on the cryptogram, a customer account associated with the contactless card;

verifying, by the processor of the mobile device, that a phone number of the mobile device is associated with the customer account;

when the phone number of the mobile device has been verified as being associated with the customer account, receiving, via the mobile application executing on the mobile device, user input for accessing the customer account; and enrolling, by the processor of the mobile device, the contactless card with the mobile application for digitally accessing the customer account via the mobile application.

2. The method of claim 1 further comprising:

responsive to accessing the web page at the network address via the mobile application executing on the mobile device, displaying, on a display device of the mobile device, a solicitation for communication with the contactless card.

3. The method of claim 1 further comprising:

successfully decrypting the cryptogram to identify the customer account associated with the contactless card.

4. The method of claim 3 further comprising:

decrypting protected data in the cryptogram;

comparing the protected data to stored record data associated with the contactless card; and identifying the customer account based on a match between the protected data and the stored record data.

5. The method of claim 1 further comprising:

transmitting the cryptogram from the mobile device to a server; and receiving, at the mobile device, an indication that the phone number of the mobile device is associated with the customer account.

6. The method of claim 5 further comprising:

transmitting a message from the mobile device to the server, wherein the message includes the cryptogram and the phone number of the mobile device.

7. The method of claim 1 further comprising:

when the phone number of the mobile device has been verified as being associated with the customer account, displaying, on a display device of the mobile device, a user name for the customer account and a solicitation for a password for the customer account to create or log into the customer account.

8. A non-transitory computer-readable medium comprising instructions that, when executed by a processor, cause the processor to:

receive, via a wireless card reader of a mobile device, a network address from a contactless card;

access, via a mobile application executing on the mobile device, a web page at the network address;

display, on a display device of the mobile device, a solicitation for communication with the contactless card responsive to accessing the web page at the network address;

receive, via a short-range communication antenna of the mobile device, a cryptogram from the contactless card;

identify, based on the cryptogram, a customer account associated with the contactless card;

verify that a phone number of the mobile device is associated with the customer account;

when the phone number of the mobile device has been verified as being associated with the customer account, receive, via the mobile application executing on the mobile device, user input for accessing the customer account; and enroll the contactless card with the mobile application for digitally accessing the customer account via the mobile application.

9. The non-transitory computer-readable medium of claim 8 wherein the instructions further cause the processor to receive the network address from the contactless card via the wireless card reader of the mobile device scanning a two-dimensional data code or a sticker on the contactless card or a paper associated with the contactless card.

10. The non-transitory computer-readable medium of claim 8 wherein the instructions further cause the processor to successfully decrypt the cryptogram to identify the customer account associated with the contactless card.

11. The non-transitory computer-readable medium of claim 10 wherein the instructions further cause the processor to:

decrypt protected data in the cryptogram;

compare the protected data to stored record data associated with the contactless card; and identify the customer account based on a match between the protected data and the stored record data.

12. The non-transitory computer-readable medium of claim 8 wherein the instructions further cause the processor to:

transmit the cryptogram to a server; and receive an indication that the phone number of the mobile device is associated with the customer account.

13. The non-transitory computer-readable medium of claim 12 wherein the instructions further cause the processor to transmit a message to the server, and wherein the message includes the cryptogram and the phone number of the mobile device.

14. The non-transitory computer-readable medium of claim 12 wherein, when the phone number of the mobile device has been verified as being associated with the customer account, the instructions further cause the processor to display, on a display device of the mobile device, a user name for the customer account and a solicitation for a password for the customer account to create or log into the customer account.

15. A mobile device comprising:

a wireless card reader;

a short-range communication antenna;

a display device;

a processor; and a memory storing instructions that, when executed by the processor, cause the processor to:

scan, via the wireless card reader, a two-dimensional data code or sticker on a contactless card or a paper associated with the contactless car;

responsive to scanning the two-dimensional code or the sticker, receive, via the wireless card reader, a network address from a the contactless card;

access, via a mobile application executing on the mobile device, a web page at the network address;

display, on the display device, a solicitation for communication with the contactless card responsive to accessing the web page at the network address;

receive, via the short-range communication antenna, a cryptogram from the contactless card;

transmit the cryptogram to a server;

identify, based on the cryptogram, a customer account associated with the contactless card;

verify that a phone number of the mobile device is associated with the customer account by receiving an indication thereof;

when the phone number of the mobile device has been verified as being associated with the customer account, receive, via the mobile application executing on the mobile device, user input for accessing the customer account; and enroll the contactless card with the mobile application for digitally accessing the customer account via the mobile application.

16. The mobile device of claim 15 wherein the instructions further cause the processor to successfully decrypt the cryptogram to identify the customer account associated with the contactless card.

17. The mobile device of claim 15 wherein, when the phone number of the mobile device has been verified as being associated with the customer account, the instructions further cause the processor to display, on the display device, a user name for the customer account and a solicitation for a password for the customer account to create or log into the customer account.

* * * * *